(12) United States Patent
Sharma et al.

(10) Patent No.: US 10,783,254 B2
(45) Date of Patent: Sep. 22, 2020

(54) SYSTEMS AND METHODS FOR RISK RATING FRAMEWORK FOR MOBILE APPLICATIONS

(71) Applicants: Praveen Kaushik Sharma, Ashland, MA (US); Pierre C. Trepagnier, Medford, MA (US); Evan J. Fiore, Chelmsford, MA (US)

(72) Inventors: Praveen Kaushik Sharma, Ashland, MA (US); Pierre C. Trepagnier, Medford, MA (US); Evan J. Fiore, Chelmsford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 323 days.

(21) Appl. No.: 14/505,273

(22) Filed: Oct. 2, 2014

(65) Prior Publication Data
US 2016/0154960 A1    Jun. 2, 2016

(51) Int. Cl.
  *G06F 21/57* (2013.01)
  *G06F 21/56* (2013.01)
  *G06N 20/00* (2019.01)
(52) U.S. Cl.
  CPC ............ *G06F 21/577* (2013.01); *G06F 21/56* (2013.01); *G06N 20/00* (2019.01); *G06F 2221/033* (2013.01)
(58) Field of Classification Search
  CPC ...... G06F 21/577; G06F 21/56; G06N 99/005
  USPC ...................................................... 726/22–25
  See application file for complete search history.

(56) References Cited

U.S. PATENT DOCUMENTS

| 7,752,609 | B2 | 7/2010 | Rioux | |
| 8,301,333 | B2 * | 10/2012 | Singh | .................. G07C 5/0808 701/31.4 |
| 8,321,941 | B2 * | 11/2012 | Tuvell | ..................... G06F 21/56 726/24 |
| 8,365,155 | B2 | 1/2013 | Rioux | |

(Continued)

OTHER PUBLICATIONS

Z. Aung, W. Zaw, "Permission-Based Android Malware Detection," International Journal of Scientific & Technology Research, vol. 2, Issue 3, Mar. 2013.

(Continued)

*Primary Examiner* — Farid Homayounmehr
*Assistant Examiner* — Suman Debnath
(74) *Attorney, Agent, or Firm* — McCarter & English, LLP; David R. Burns; Coalton S. Bennett

(57) ABSTRACT

Systems, methods and computer readable medium for training a risk rating system for assessing a risk of a mobile application are disclosed. One or more features representing operational characteristics of mobile applications and malware are extracted. A first learning classifier and a second learning classifier are trained using the extracted features. A machine learning risk rating model is generated, based on the combination of the first learning classifier and the second learning classifier to calculate a risk rating based on the features and a correlation of the features. Systems, methods, and computer readable medium for assessing a risk for a mobile application are also disclosed. One or more features of a mobile application are extracted. A learning classifier is applied to the extracted features. A risk rating is determined based on the result of the classifier.

20 Claims, 17 Drawing Sheets

(56) References Cited

U.S. PATENT DOCUMENTS

| | | |
|---|---|---|
| 8,499,353 B2 | 7/2013 | Lockhart et al. |
| 8,613,080 B2 | 12/2013 | Wysopal et al. |
| 8,713,684 B2 | 4/2014 | Bettini et al. |
| 9,152,694 B1* | 10/2015 | Padidar ................ G06F 21/51 |
| 9,401,926 B1* | 7/2016 | Dubow .............. H04L 63/1408 |
| 2004/0133508 A1* | 7/2004 | Lawrence ............. G06Q 30/02 |
| | | 705/38 |
| 2004/0230835 A1 | 11/2004 | Goldfeder et al. |
| 2009/0119394 A1* | 5/2009 | Winkler ................ H04L 41/12 |
| | | 709/223 |
| 2010/0281248 A1 | 11/2010 | Lockhart et al. |
| 2011/0173693 A1 | 7/2011 | Wysopal et al. |
| 2012/0254333 A1* | 10/2012 | Chandramouli ........ G06F 17/27 |
| | | 709/206 |
| 2013/0097706 A1 | 4/2013 | Titonis et al. |
| 2013/0152062 A1 | 6/2013 | Rioux |
| 2013/0227516 A1 | 8/2013 | Kriegsman |
| 2013/0227636 A1 | 8/2013 | Bettini et al. |
| 2013/0254889 A1 | 9/2013 | Stuntebeck |
| 2013/0347094 A1 | 12/2013 | Bettini et al. |
| 2014/0101761 A1* | 4/2014 | Harlacher ........... H04L 63/1425 |
| | | 726/23 |
| 2014/0250153 A1* | 9/2014 | Nixon ............... G06F 17/30312 |
| | | 707/812 |
| 2015/0033341 A1* | 1/2015 | Schmidtler ............. H04L 63/14 |
| | | 726/23 |
| 2015/0161386 A1* | 6/2015 | Gupta ................ G06F 11/3612 |
| | | 726/23 |
| 2015/0379264 A1* | 12/2015 | Alme .................... G06F 21/563 |
| | | 726/23 |

OTHER PUBLICATIONS

D. Koundel, S. Ithape, V. Khobaragade, R. Jain, "Malware Classification using Navie Bayes Classifier for Android OS," The International Journal of Engineering and Science, vol. 3, Issue 4, pp. 59-63, 2014.

N. MacDonald, J. Feiman, "Magic Quadrant for Application Security Testing," Gartner Inc., Jul. 2, 2011.

International Preliminary Report on Patentability issued in International Application No. PCT/US2015/053506 dated Apr. 4, 2017.

* cited by examiner

SYSTEMS AND METHODS FOR RISK RATING FRAMEWORK FOR MOBILE APPLICATIONS

STATEMENT OF GOVERNMENT INTEREST

This invention was made with Government support under Contract No. FA8721-05-C-0002 awarded by the U.S. Air Force. The Government has certain rights in the invention.

TECHNICAL FIELD

The present invention generally relates to methods, systems, and computer-readable medium for determining a risk-rating for computer executable applications.

BACKGROUND

Malware are malicious computer applications which intentionally interfere with a system's functionality and have capabilities to cause damage to data, and security of the system. A malware computer application may send personal information, secure information, or otherwise private information or data to an unintended third party. Users and organizations are interested in knowing the risk of downloading and/or using computer applications on their mobile devices or computer systems in view of malware or security concerns.

BRIEF DESCRIPTION OF THE DRAWINGS

Some embodiments are illustrated by way of example in the accompanying drawings and should not be considered as a limitation of the invention.

DESCRIPTION OF EXEMPLARY EMBODIMENTS

Described in detail herein are systems, methods, and computer-readable medium for a risk-rating framework for mobile computer applications. The risk-rating framework (RRF) helps in evaluating a risk or vulnerability of mobile computer applications before installing them on a user device. The RRF system considers the characteristics of the computer applications in addition to the application software code. The RRF system is a machine learning system that uses a first classifier, or a second classifier, or a first and second classifier, or more than two classifiers. The classifiers may be a Partial Least Squares or Bayesian based computational classifiers or any other suitable classifiers to automatically assess the risk of a mobile computer application. The classifiers use manifest and static features computationally extracted from the mobile computer application to provide a risk-rating in a selected range. The extracted features represent operational characteristics of the computer application. The rating indicates the probability of the mobile computer application being malware or manifesting malware-like behavior based on the existence or absence of certain features and the correlation between the features. The risk rating system can use the correlation between the features such that an existence of certain of features simultaneously, or an absence of certain of features simultaneously, or an existence and absence of certain features simultaneously, can indicate a likelihood of the computer application being malware or benign. The risk assessment is based on manifest and static features extracted from the computer applications using one or more feature extraction tools. The classifiers consider the features and the correlations among the features in determining a risk-rating.

The RRF system is a machine learning system and the classifiers are machine learning classifiers that can learn from a data set and construct a model that aids in evaluating a risk level of computer applications. The classifiers are first trained and tested using an input data set that includes known-malware and known-benign computer applications. The RRF system may include a set of static and manifest executable extraction tools, a graphical user-interface, and other components supporting the execution of the classifiers. The RRF system may use one classifier or a plurality of classifiers, as discussed below. The functionality and components of the RRF system are described in detail below.

Figure 1A:
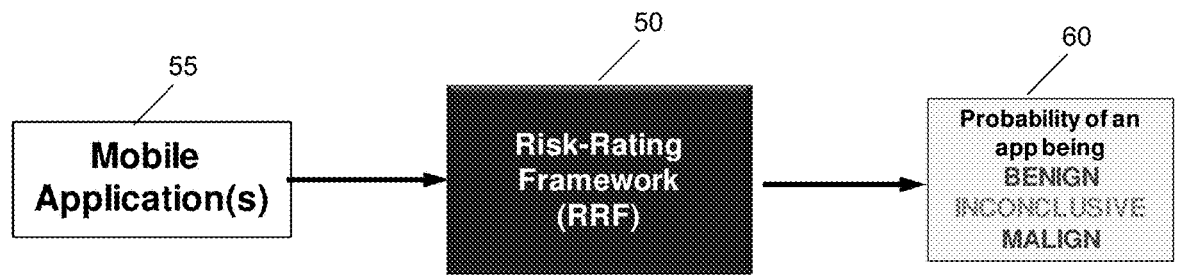
FIG. 1A depicts a high-level overview of a system for a risk-rating framework (RRF), according to example embodiment.

FIG. 1A depicts a high-level block diagram overview of a risk-rating framework (RRF) system. As shown in FIG. 1A, one or more portions of a mobile computer application 55 is an input to the RRF system 50, and the output is a probability 60 of the computer application being benign, malign, or inconclusive (requiring additional analysis to determine its risk). In other words, a risk rating is provided by the RRF system 50 for a computer application 55 to indicate its likelihood of containing undesirable code and characteristics. An computer application 55 is a software program designed to run on mobile devices. A mobile device can be, for example, a smartphone, a tablet computer, a smartwatch, a portable device, a wearable device, and the like. In alternative embodiments, computer applications 55 can be a computer program designed to run on any device with a processor. The output 60 of the RRF system 50 is a rating that indicates the probability of a mobile computer application being malware or manifesting malware-like behavior. A computer application may be malware if its software code indicates a possibility to damage or disable a device, or the computer application may share private information to an unintended third-party or access certain features or components of the mobile computational device. In some embodiments, a computer application may be considered malware if it shares or exposes any information without a user's permission, or it shares any information that a user did not want to. In some embodiments, the RRF system takes into consideration user-defined guidelines, wherein a user may specify the information he or she does not want to share, in other words, wants to keep private. As used herein, a computer application includes any mobile application run on a mobile platform and a mobile Operating System (OS), any desktop application run on a desktop (PC, laptop, etc.) platform and desktop (Windows, Mac, etc.) OS, any server application run on a server platform and server OS, any thin-client application, and other similar computer applications.

Figure 1B:
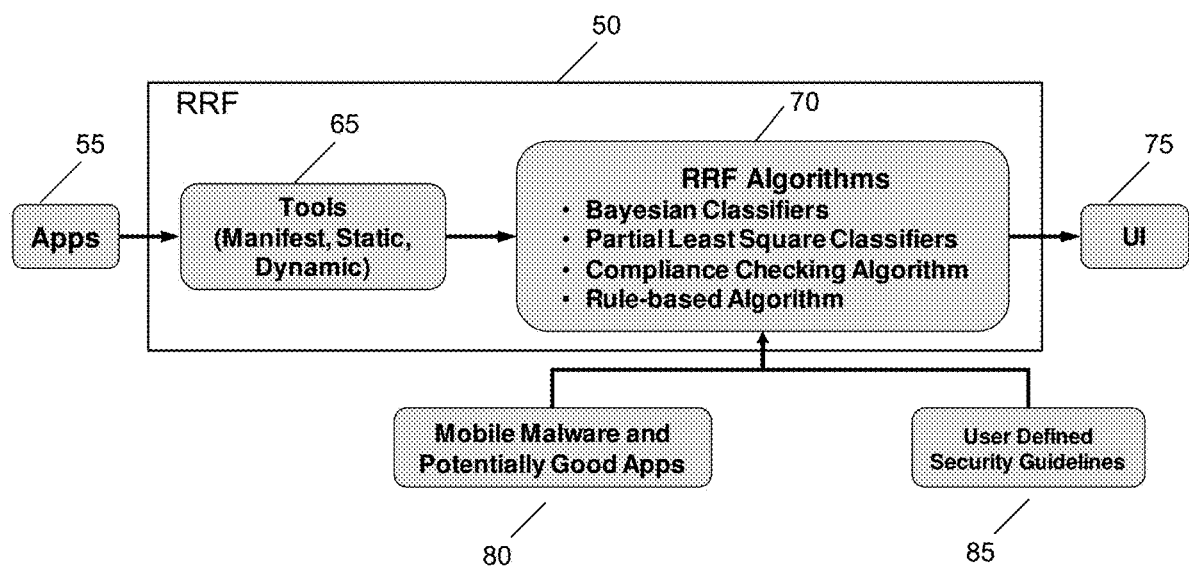
FIG. 1B depicts a high-level overview of a system for a RRF system, according to example embodiment.

FIG. 1B depicts an overview of a RRF system. The computer application 55 is provided as an input to the RRF system 50. The RRF system 50 includes analysis tools 65 and classifiers 70. The tools 65 and classifiers 70 are used to analyze computer applications 55. In some embodiments, the tools 65 are programmed to extract certain features from the computer applications 55 for analysis. The extracted features are used by the classifiers 70 to evaluate the risk of computer applications 55. Some of the analysis tools 65 include manifest, static, and dynamic analysis tools. A manifest analysis tool may extract features and information from an applications' manifest file. The manifest file contains information regarding files that are included in the computer application package. A static analysis tool may extract features and information regarding an applications' software code, such as, code size, run time, and the like. A dynamic analysis tool may extract features and information related to the computer application when it is running or operating, such as, incoming and outgoing application calls, and the like. Some of the features that may be extracted and analyzed include, but are not limited to, declared permissions, declared intents, declared hardware features, used permissions, used intents, used hardware features (such as GPS, memory, camera), code execution, audio/video eavesdropping, certain function or API calls, device settings harvesting, connection interfaces exfiltration, suspicious connection establishment, telephony services abuse, telephony identifiers leakage, location lookup, and personal information management (PIM) data leakage. Analysis of such features can help identify computer applications that exhibit malware or malicious characteristics. For example, when a computer application has a set of declared permissions, intents, and hardware features, but only uses a subset of the declared permissions, intents and hardware features, such characteristics may contribute to the computer application's risk rating.

The extracted features are used by the classifiers 70 to analyze computer applications 55. The classifiers 70 include Bayesian classifiers, Partial Least Square (PLS) classifiers, Compliance Checking algorithm, and Rule-based algorithm The Bayesian classifiers and PLS classifiers determine the relevance of the features, recognize the correlation between the features, and/or predict a correlation between the features. The Bayesian classifiers and PLS classifiers are described in detail below. The Compliance Checking and Rule-based algorithms determine if a user-defined security guideline is violated. These algorithms may use rules and/or heuristic methods to determine violations of user-defined security guidelines. For example, based on the permissions of the application and API calls the application makes, a determination is made whether the application is writing to a persistent memory, such as a Secure Digital (SD) memory card, or whether the application executes a UNIX command.

The RRF system 50 is trained using known malware and potentially good computer applications 80. The RRF system 50 also incorporates user-defined security guidelines 85. The risk rating for the computer application may be provided in a user interface 75. In some embodiments, the RRF system may only include some of the classifiers shown in FIG. 1B. For example, the RRF system may only use the PLS classifier to analyze the extracted features. In another example, the RRF system may only use the Bayesian classifier to analyze the extracted features. In yet another example, the RRF system may use the PLS classifier and the Bayesian classifier to analyze the extracted features.

In some embodiments, a threat model can be incorporated into the RRF system. A threat model can address specific concerns of an organization regarding installation and use of computer applications on mobile devices. The threat model can consist of security guidelines defined by a user or an entity. The threat model can also focus on the different mediums (for example, WiFi connection, smartphone broadband Internet connection, etc.) via which a threat may attack, exploit vulnerabilities, and/or bypass security. One of the steps of building the threat model involves analyzing the user-defined security guidelines to determine which aspects and features of the computer application need to be analyzed in the RRF system. For example, incorporating the security guidelines may require analysis of the source code of the application, static analysis, dynamic analysis, and/or run-time analysis. The Bayesian model classifier can capture a threat model by focusing on how different features of the application interact for a specific threat to manifest. The PLS model classifier can capture a threat model implicitly by selecting features that impact most of the threats.

Possible concerns that can be addressed or included in the threat model includes leakage of sensitive information and privacy disclosure of personal information (e-mails, call logs, photos, contact lists, browser history logs), sensor information (GPS, accelerometer, audio, microphone, camera, SD card), device metadata (phones ID, system preferences, phone numbers), and user credentials (passwords, account information). Another concern that can be addressed by the threat model includes tampering with information, applications, services and/or device, for example, unauthorized usage of cell or cell service, intercepting or redirecting calls, SMS, MMS, making premium service calls or premium SMS messages, persistent monitoring of devices, shutting off of security software, and the like. Another example concern that can be addresses by the threat model includes degradation, disruption, or denial of information or service, for example, battery drainage, network traffic generation, bricking device, crashing applications, and the like.

Some examples of user-defined security guidelines that can be incorporated into the RRF system include, but are not limited to the following: the mobile application must not execute as a privileged operating system process unless necessary to perform any application functions, the mobile application must not write data to persistent memory accessible to other applications, the mobile application must not change the file permissions of any files other than those dedicated to its own operation, the mobile application must not permit execution of code without user direction unless the code is sourced from an organization-defined list of approved network resources, the mobile application code must not include embedded interpreters for prohibited mobile code. Additional examples of user-defined security guidelines include the mobile application must fail to an initial state when the application unexpectedly terminates, unless it maintains a secure state at all times, the mobile application must prevent XML injection, the mobile application must validate the correctness of data inputs, the mobile application must define a character set for data inputs, and the mobile application must not contain format string vulnerabilities.

The following description is presented to enable any person skilled in the art to create and use a computer system configuration and related method and system to determine a risk-rating for a mobile application. Various modifications to the example embodiments will be readily apparent to those skilled in the art, and the principles defined herein may be applied to other embodiments and applications without departing from the spirit and scope of the invention. The present disclosure is not intended to be limited to the embodiments shown, but is to be accorded the widest scope consistent with the principles and features disclosed herein.

Figure 2:
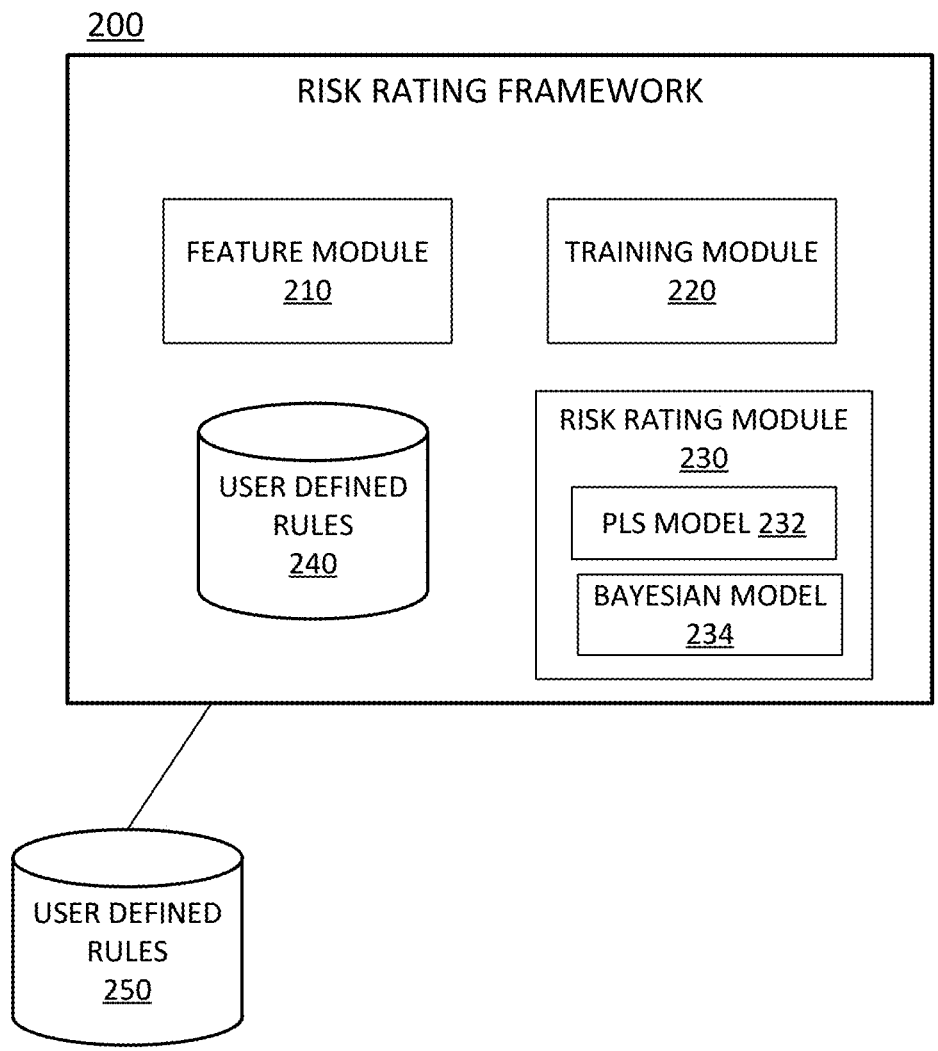
FIG. 2 is a block diagram showing a RRF in terms of modules, according to an example embodiment.

FIG. 2 is a block diagram 200 showing a RRF system in terms of modules, according to an example embodiment. The modules may include various circuits, circuitry and one or more software components, programs, applications, or other units of code base or instructions configured to be executed by one or more processors included in one or more computing devices. In other embodiments, one or more of modules 210-230 may be included in a server or a database server while other of the modules 210-230 are provided in the computing devices. Although modules 210-230 are shown as distinct modules in FIG. 2, it should be understood that modules 210-230 may be implemented as fewer or more modules than illustrated. It should be understood that any of modules 210-230 may communicate with one or more components included in the environment 100. The modules include a feature module 210, training module 220, and a risk-rating module 230. Additionally, the RRF system 200 can include a database for user defined rules 240. Alternatively, the RRF system 200 can communicate to an external database for user defined rules 250. In another embodiment, the RRF system 200 can include database 240 and can also communicate with external database 250.

The feature module 210 may be a hardware-implemented module, a software-implemented module or a combination of both, which may be configured to analyze mobile computer applications and extract various features from the computer applications as described in detail below. The feature module 210 may use various tools and applications to analyze mobile computer applications and to extract features. A feature represents an operational characteristic of the computer application. A feature may be one or more parameters, variables, calls, and/or any other characteristic related to the computer application. Examples of various features are given throughout the disclosure.

The training module 220 may be a hardware-implemented module, a software-implemented module or a combination of both, which may be configured to train and test the RRF system as described in detail below. The training module 220 may train and test the RRF system for different classifiers, such as, Partial Least Squares and Bayesian model classifiers. The training module 220 also allows for retraining the RRF system to include new threat models and/or user defined security guidelines. The risk-rating module 230 may be a hardware-implemented module, a software-implemented module or a combination of both, which may be configured to provide a risk rating for a mobile computer application using a PLS model classifier 232, or a Bayesian model classifier 234, or a PLS model classifier 232 and a Bayesian model classifier 234 as described in detail below. Database 240 and 250 may contain data related to user defined security guidelines (discussed above) that may be considered by the RRF system in training the model classifiers and in evaluating the computer application.

Figure 3:
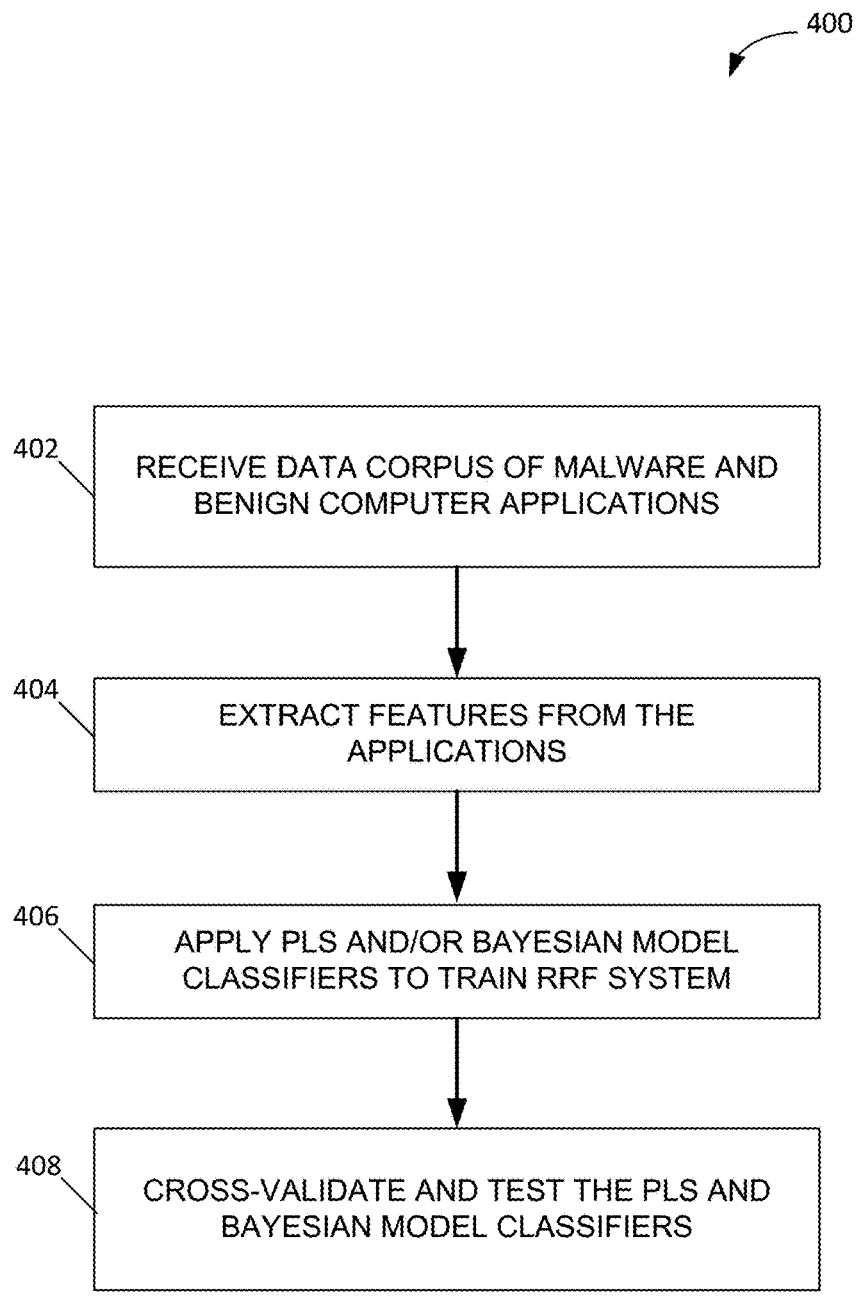
FIG. 3 is a flowchart for a method for training a RRF system, according to an example embodiment.

FIG. 3 is a flowchart of a method 400 for training a RRF system, according to an example embodiment. At block 402, the RRF system is trained by receiving a data corpus of mobile computer applications, which includes known-malware and known-benign computer applications. At block 404, one or more features are extracted from each of the computer applications, for example, using feature module 210. The features that are extracted may include declared permissions, intents, used permissions, and the like. At block 406, the extracted features, in addition to other parameters, are used to train the RRF system to evaluate a risk of an computer application. In some embodiments, the RRF system implements a Partial Least Square model classifier, or a Bayesian model classifier (for example a Naïve Bayesian classifier or a Tree-Augmented Naïve Bayesian classifier), or a Partial Least Square and Bayesian model classifier. At block 406, the trained RRF system is cross-validated and tested using a subset of the computer applications from the data corpus. In alternative embodiments, the RRF system may be tested using another data corpus. The training phase, testing phase, and classifiers are discussed in detail below.

Figure 4:
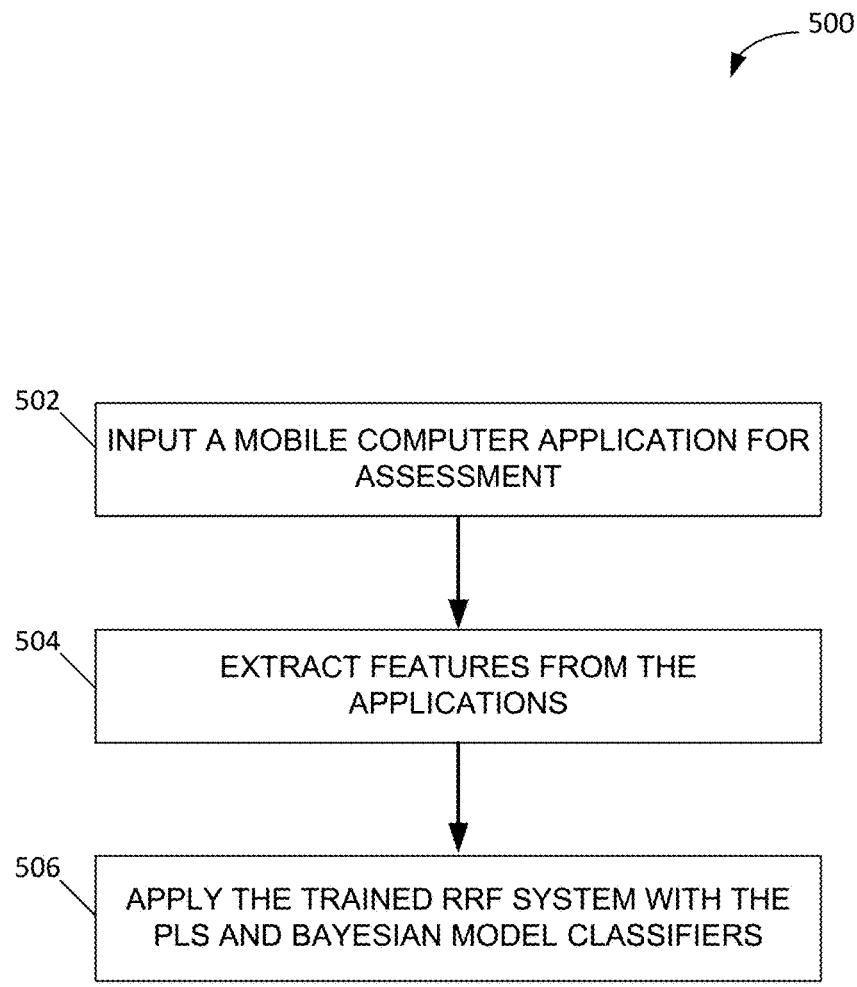
FIG. 4 is a flowchart for a method for using a RRF system, according to an example embodiment.

FIG. 4 is a flowchart of a method 500 for using a RRF system, according to an example embodiment. Once the RRF system is trained, a computer application of interest can be evaluated. At block 502, a computer application is received by the RRF system. At block 504, one or more features are extracted from the computer application, for example, by the feature module 210. At block 506, the trained RRF system, including the PLS and/or Bayesian model classifiers of the risk rating module 230 (described in detail below), are applied to the extracted features to determine a risk-rating of the computer application.

Figure 5A:
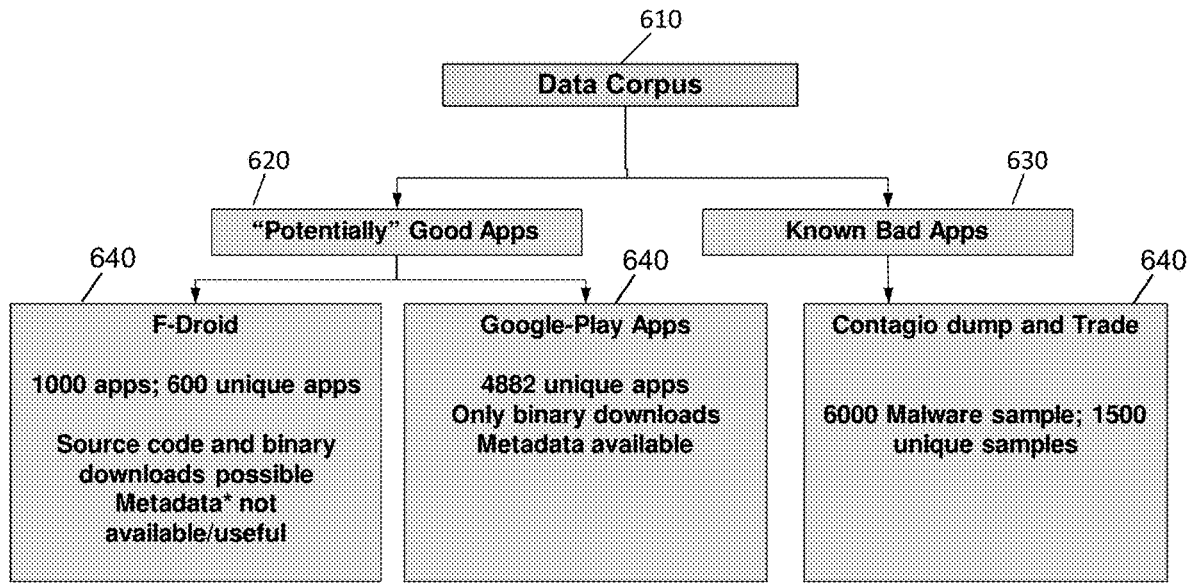
FIG. 5A is a description of a data corpus for training a RRF system, according to an example embodiment.
Figure 5B:
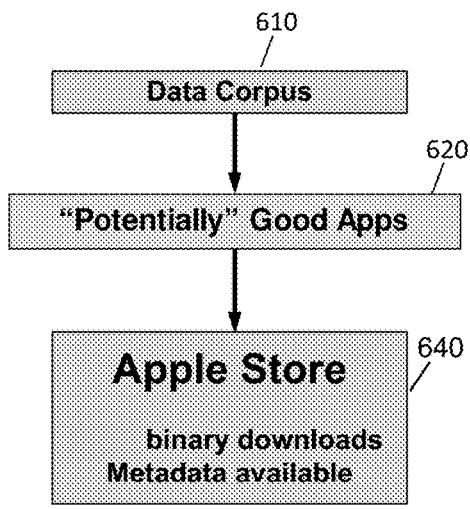
FIG. 5B is a description of a data corpus for training a RRF system, according to an example embodiment.

FIGS. 5A and 5B depict an example data corpus 610 used to train a RRF system, according to an example embodiment. As shown in FIG. 5A, an example training data corpus may include a number of known-malware computer applications 630 and potentially good computer applications 620. For example, the data corpus 610 may include approximately 1500 known-malware computer applications, and approximately 5500 potentially good computer applications that can be used to train the RRF system. The computer applications and their known-risk may be obtained from third-party sources 640, such as, Contagio (www.contagio-dump.blogspot.com) 640, Google Play store 640, and F-Droid App store 640. FIG. 5B depicts an alternative source 640 for potentially good computer applications 620 to train the RRF system, for example, the Apple App store 640. Even though FIGS. 5A and 5B depict the data set including a specific number of malware and good computer applications from a specified application store, any number of malware and/or good computer applications can be used to train the RRF system. The computer applications and their known-risk can also be obtained from any number of application stores.

The RRF system uses features of a computer application to evaluate its risk. The features of a computer application can be extracted using a variety of tools that extract static, dynamic, and/or manifest features of a computer application. The feature module 210 can be made up of one or more of the feature extraction tools to evaluate a computer application. Additionally, these tools can also be used to train the model classifiers. The extracted features represent one or more operational characteristics of a computer application. Below is a summary of some of the example features that are used by the RRF system. Some example tools to extract the example features are also discussed. Some of the example tools may be open-source tools, that in some embodiments are modified to extract features that are evaluated by the RRF system. Tools other than ones discussed below can also be used to extract features that can be used in the RRF system. The tools may be a software application that is available for use online or via a machine-readable storage-medium. The tools may also be modified to suit the purposes of the RRF system, for example, the tools may be modified to resolve inconsistencies in their output, and to parallelize them for efficiency.

One of the example tools may be the Android Asset Packaging Tool (AAPT), which is part of the Android SDK that is used as a part of automatic packaging of Android application package (APK) files. It allows for convenient extraction of various fields in an application's manifest, such as any declared permissions, the application's name, version number, etc, as well as extracting a human-readable version of the manifest. The application's manifest file presents information about the computer application to the operating system. Using AAPT, features like, but not limited to, declared permissions, declared intents, declared hardware features, may be extracted for use in the RRF system.

Another example tool may be the Androguard, which is an open-source suite of Python scripts that performs byte-code static analysis of APK files. The suite has a large amount of functionality, from decompilation of Dalvik bytecode to detecting and mapping API calls to permissions to limited malware signature checking. For use in the RRF system, Androguard can be modified by adding a script to obtain metadata of the latest version of the computer application from the Google Play Store. Androguard can be further modified by augmenting the API mappings to the latest version of APIs. Using Androguard, features like, but not limited to used permissions may be extracted for use in the RRF system.

Built upon Androguard, Androwarn is another example tool with a focus on detecting higher level threats, such as the sending of premium Short Message Service (SMS) messages. A premium SMS message is a way for a user to receive content from a third-party vendor via an SMS message. The user is usually charged a premium for such service that is added to the user's phone bill automatically. An example of the content received from a third-party includes a 'joke-of-day' or 'trivia fact.' Such content is usually sent on a periodic basis to the user's device via an SMS message. Many times such premium SMS messages are used for scam and fraudulent reasons, and the user incurs the premium charges automatically on his or her phone bills.

Taken at face value, the category headers and descriptions of the Androwarn can be alarmist, but their rules do highlight potential issues. This tool also provides parsing of the certificate that signed the APK file. However, this is often of limited use since Android allows self-signed certificates and Google Play does not have any stricter requirements. Using Androwarn, features like, but not limited to, UNIX code execution, audio/video eavesdropping, device settings harvesting, connection interfaces exfiltration, suspicious connection establishment, telephony services abuse, telephony identifiers leakage, location lookup, and personal information management (PIM) data leakage may be extracted for use in the RRF system.

In addition to the ones described above, other similar tools may be used to extract features. Some of these other tools for static analysis for Android applications include APKInspector, Coverity, Delvik ByteCode Analysis, Dexpler, Dexter, HP Fortify, JED, Klocwork, Stowaway, Symdroid, PushDownoo, and the like. Tools for dynamic analysis for Android applications include Android Audit Tools, Apkview-tracer, ASEF, Droidbox, DroidScope, Mercury, TaintDroid, and the like. Tools for services analysis for Android applications include Andrubis, AntiLVL, APKTool, ARE, AXMLPrinter2, ContrOWL, Dare: Dalvik Retargetting, Google Bouncer, IDA Pro, Mobile-Sandbox, and the like. Tools for analyzing Apple iOS applications include Macholib, BiPlist, MIT LL reputation libs, and the like.

After the features are extracted, they are used to construct a feature vector. In an example embodiment, features are represented as binary values with FALSE indicating 0 and TRUE indicating 1. In other words, the existence or presence of a feature may be indicated by 1, while the absence of a feature can be indicated by 0. In an alternative embodiment, the presence of a feature may be indicated by a 0, while the absence of a feature may be indicated by a 1. The rest of the logic and classifiers may be revised accordingly.

In some embodiments, a feature vector is constructed using a Bayesian model classifier. For the Bayesian classifier, all the features are inputted to the classifier. The classifier analyses each feature and determines if each feature contributes to the probability that the computer application is malware. The classifier is designed to consider each feature to contribute independently to the probability of being malware. Subsequently, the probability of each feature is computed by using the frequency-counting approach. The probability of each feature given a computer application is a malware is computed. "Malware" is considered as the class variable that the model classifiers are determining, that is the Bayesian and PLS model classifiers determine whether or not an application belongs to a malware class. The malware class is assigned a default probability of 0.5 following an uniform distribution. The frequency-counting approach determines the probability of an application belonging to a class by counting the number of times an application is malware given that a feature is "true" or "false."

In some embodiments, a feature vector is constructed as the input to a Partial Least Square Regression (PLS) model classifier. For the PLS model classifier, feature vectors include n-tuples of Boolean variables as well as single Boolean variables. Here, an n-tuple is defined to be the product of n Boolean variables. For example, a 3-tuple would be the product of 3 Boolean variables, where the Boolean variable corresponds to the presence or absence of a feature. These n-tuples may also be thought of as a logic AND gate of n variables. The number of possible tuples for the features is high. For example, there may be one hundred and thirty-four features corresponding to manifest permissions that can be extracted for a computer application. The number of possible 3-tuples is the binomial coefficient $_{134}C_3$ (134 choose 3) which equals to 392,082 tuples. If an embodiment with 5-tuples is considered, then the number of possible 5-tuples is $_{134}C_5$ (134 choose 5) which equals to 333,859,526 tuples. Inputs of this size (the possible 5-tuples) are possible for a feature vector using the PLS classifier but it is time and resource consuming.

In one embodiment, selected features are determined using a frequency-sorting classifier. For benign computer applications, each tuple class (2-tuples, 3-tuples, 4-tuples, and 5-tuples) is ordered by frequency. Then the top N features are selected (where, in an example embodiment, N is on the order of 30) from each tuple class for inclusion in the feature vector. For malign computer applications, the same steps as benign computer applications are performed, but those tuples which have already been selected from the benign computer applications are excluded.

As an example, consider a scenario where N=3 and 4-tuples are being analyzed. Suppose, in this example, that the top three 4-tuples from benign applications are [(feature1, feature7, feature8, feature9); (feature1, feature8, feature9, feature11); and (feature2, feature7, feature8, feature9)]. Suppose that the top four 4-tuples from malware are [(feature1, feature7, feature8, feature9); (feature2, feature8, feature9, feature11); (feature3, feature7, feature8, feature9); and (feature4, feature7, feature8, feature9)]. The 4-tuple of (feature1, feature7, feature8, feature9) is skipped for malware because it is a duplicate of a 4-tuple that is already chosen in the benign class. Therefore, the chosen set of six 4-tuples is [(feature1, feature7, feature8, feature9); (feature1, feature8, feature9, feature11); (feature2, feature7, feature8, feature9); (feature2, feature8, feature9, feature11); (feature3, feature7, feature8, feature9); and (feature4, feature7, feature8, feature9)]. In some embodiments, a tuple is marked as true only if all of the features in the tuple are true, otherwise the tuple is marked false. In this manner, the tuples indicate co-occurrence of a set of features.

The above frequency-sorting classifier ensures that frequently-occurring tuples are represented in the feature vector, and the tuples that emphasized the differences between benign and malign computer applications are selected. In some embodiments, the frequency-sorting classifier results in a selection of a few hundred Boolean variables and their tuples for feature vector construction.

In some embodiments, non-Boolean variables may also be included in the construction of the feature vectors using the PLS classifier. Non-Boolean features may include the number of received and sent intents, byte code size, the number of native calls, and the other features. In some embodiments, non-Boolean features may be included in the Bayesian classifier.

In an alternative embodiment, feature vectors are constructed using both the Bayesian and PLS classifiers for all features, and then the results are aggregated. In yet an alternative embodiment, feature vectors are constructed for some of the features using the Bayesian classifier, while other feature vectors are constructed for the remaining features using the PLS classifier. In yet another embodiment, feature vectors may be constructed using some sort of fusion of the Bayesian and PLS classifiers.

Both the PLS and Bayesian classifiers can be implemented as machine learning classifiers. As shown in FIG. 4, both classifiers run in two phases: training and testing phases. In the training phase, the RRF system is trained using known malign and known benign computer applications based on their manifest and static features, and the correlation of the features. The risk rating system can use the correlation between the features such that an existence of certain of features simultaneously, or an absence of certain of features simultaneously, or an existence and absence of certain features simultaneously, can indicate a likelihood of the computer application being malware or benign. The correlation used by the RRF system may be a correlation between the features of one computer application, and/or a correlation between the features of two or more applications. In the testing phase, the trained RRF system is cross-validated and tested. These phases are discussed in detail in below.

Training Phase

The models generated by the Bayesian and PLS classifiers are trained and cross-validated. The training data is subdivided into two sets—the first is used for training and the other for cross-validation. Cross-validation may include using Leave-One-Out with replacement method of cross-validation. The training and cross validation steps may be repeated several times, iterating over the same process, but with random partitioning of the data into training and cross-validation sets. For each iteration, either new features are added or existing features are removed.

For the PLS classifier approach, the feature vectors are z-scored column-wise. That is, for each element in the feature vector, the mean and standard deviation for the training set are calculated. Then the mean is subtracted from the element, and the resultant value is divided by the standard deviation. This process ensures fair weighting to all the elements of the feature vector. A feature vector may be an ordered set of features that are inputted in the model classifiers.

In an example embodiment, the system can be implemented in MATLAB®. In this case, the MATLAB® function plsregress can be used to construct the PLS model. The Leave-One-Out method for cross-validation of the training data set is used to decide the number of PLS factors to keep, with the mean square prediction error being the metric The mean square prediction error is the mean squared distance between the observed and predicted values. Based on this, the number of factors which minimize the mean square prediction error may be determined.

| Table 1 includes the terminology used in the classifiers. | |
|---|---|
| $w_i$ | ith weight |
| $F_i$ | ith Feature |
| $\hat{y}$ | Predicted f(n) |
| y | Actual response variable |
| m | # of apps |
| n | # of originals features |
| K | # of reduced features selected by PLS |
| o | Parameters: $w_i$ |
| $I_p$ | Information gain scoring function |
| P(M) | Probability of an app being a malware |
| $P(M/F_1, F_2, \ldots F_n)$ | Probability of an app being a malware given features $F_i$ |

PLS Model Classifier

Figure 6:
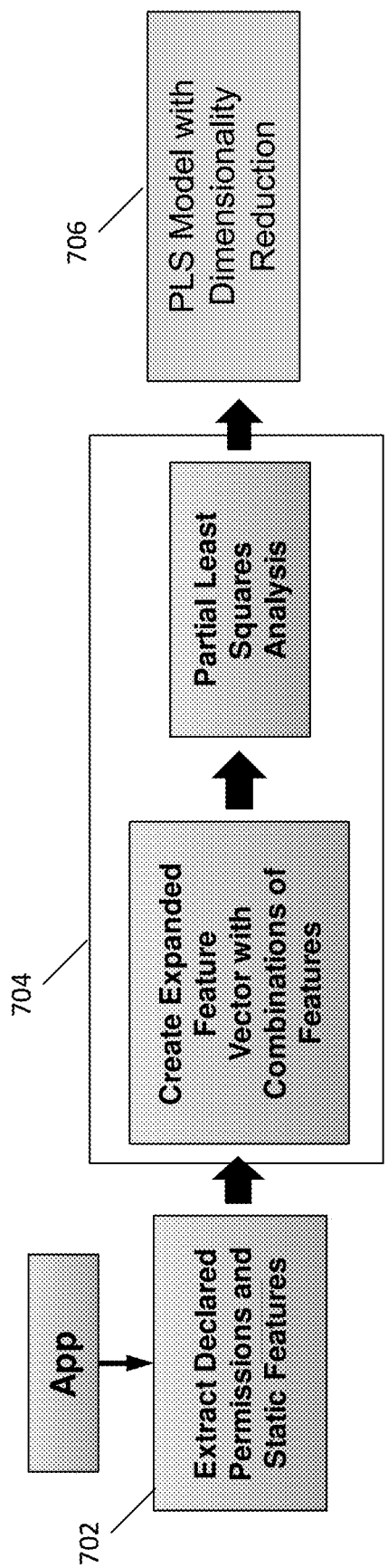
FIG. 6 depicts a RRF system with a Partial Least Squares (PLS) classifier, according to an example embodiment.

FIG. 6 illustrates the use of a PLS model classifier in a RRF system, according to an example embodiment. The feature module 210 and the training module 220 generate the PLS model. For example, the feature module 210 extracts declared permissions and static features at block 702. The training module 220 creates a feature vector as discussed below, and performs a Partial Least Square analysis at block 704.

The PLS model classifier is a method for constructing predictive models when the input variables/factors are many and highly correlated. In the PLS model classifier, the emphasis is on predicting the responses and not on trying to understand the underlying relationship between the many possible variables. Hence it is well suited to the problem at hand, which is to predict malware based on static and manifest features. At block 706, the PLS classifier aims to minimize the sum of least square errors as shown in FIG. 5 and Equations 1, 2, and 3 below.

$$\text{Objective} = \text{Minimize} \sum_{i=1}^{m} (y_i - \hat{y})^2 \quad (1)$$

$$\hat{y} = w_1 F_1 + w_2 F_2 + \ldots + w_n F_n \quad (2)$$

$$\hat{y} = \begin{cases} 0 & app \in \text{benign} \\ 10 & app \in \text{malign} \end{cases} \quad (3)$$

The classifier assigns $\hat{y}$ to 0 for benign and 10 for malign computer applications during the training phase. The set of weights $w_i$ found in the training phase is then applied in the testing phase to classify the applications.

Figure 7:
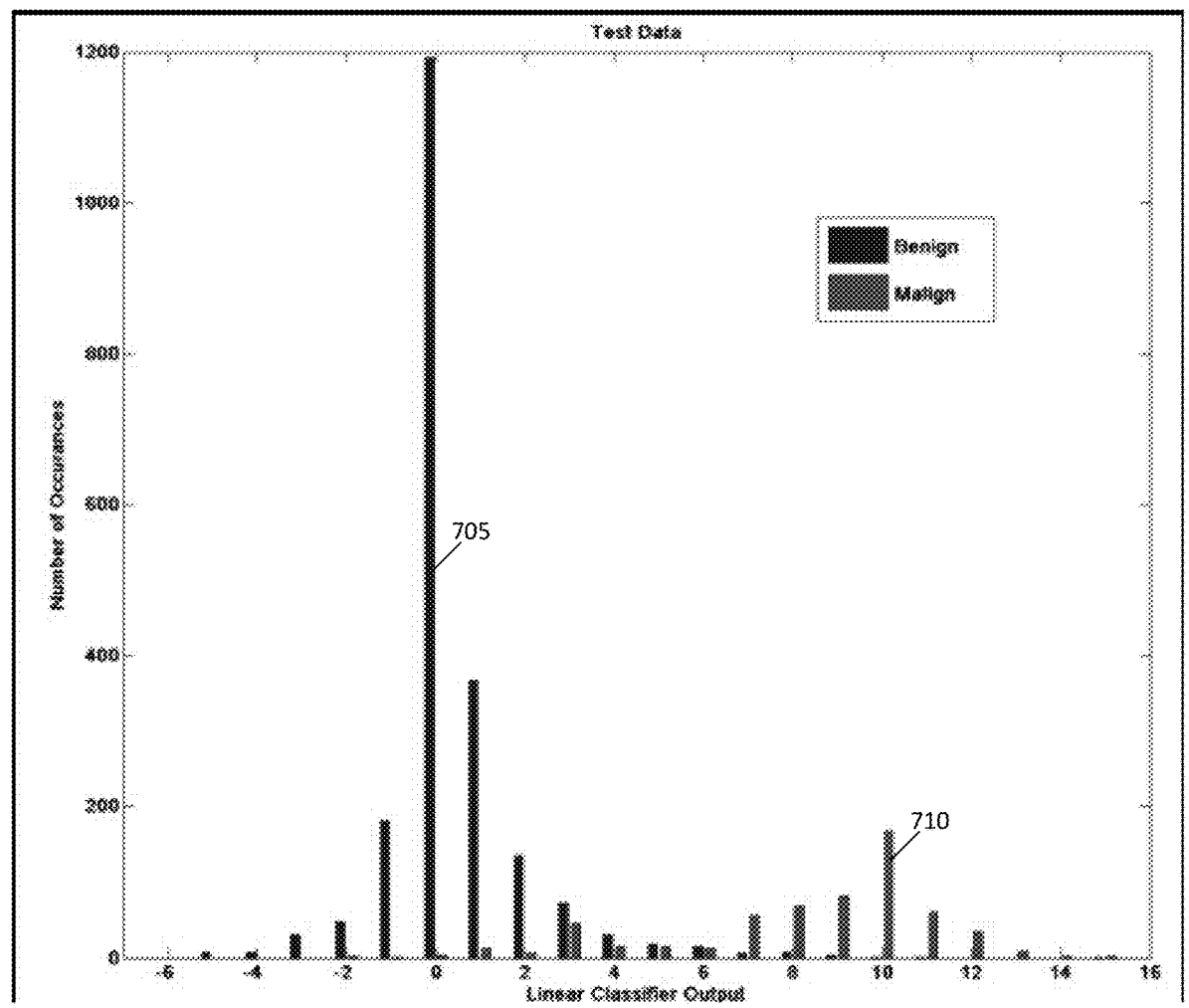
FIG. 7 is a histogram for the results of a PLS classifier within a RRF system, according to an example embodiment.
Figure 8:
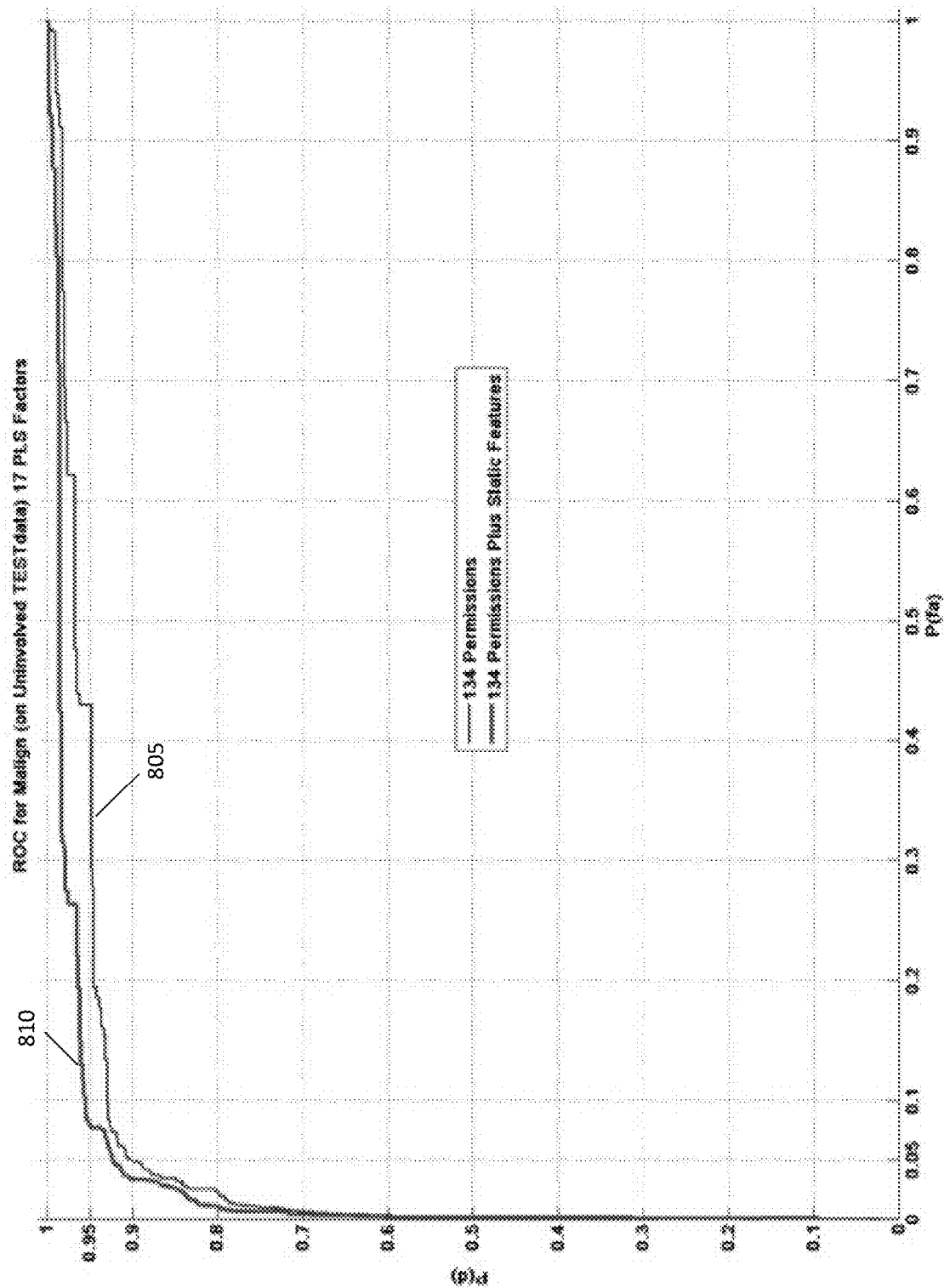
FIG. 8 is a Receiver Operating Curve for the results of a PLS classifier within a RRF system, according to an example embodiment.

FIGS. 7 and 8 depict the histogram and Receiver Operating Curve (ROC) for the PLS model classifier depicted in FIG. 6, respectively. Based on these results, the following conclusions can be derived. First, the PLS model classifier described above is able to classify malware from the non-malware computer applications successfully, though both false positives and false negatives are observed. The output of the PLS model classifier for uninvolved test data (that is, data for which ground truth is known, but which did not form part of the training set) is shown in FIG. 7.

FIG. 7 is a histogram of the output of the PLS model classifier in which true malware applications 710 are colored light grey and true benign applications 705 are colored dark grey. The horizontal axis represents the score of the PLS classifier, and the vertical axis is the number of applications having that score. Note that the modal score of the malware applications is 10, and of the benign applications is 0. However, there is not complete separation between the benign and malware applications. For a given threshold (for example 5) some benign (dark grey) applications 705 are over the threshold, and some malware (light grey) 710 applications are under the threshold. The benign (dark grey) applications 705 over the threshold are "false positives," meaning they are classified as malware when in fact they are benign. The malware (light grey) applications 710 under the threshold are "false negatives," meaning they are classified benign when in fact they are malign. As the light grey and dark grey histograms in FIG. 7 get farther apart, the number of false positives and false negatives decrease, and thus, the performance of the classifier gets better.

Another way of representing the performance of a classifier is the so-called Receiver Operating Characteristic (ROC) curve. Here, the fraction of true positives (detections) is graphed against the fraction of false positives (false alarms), for all possible thresholds. FIG. 7 shows that if the threshold were set at minus infinity (off the left of the graph), all applications would be above the threshold, so the fraction of true positives is 1, and the fraction of false alarms is also 1. As the threshold sweeps through the histogram to plus infinity, eventually the fraction of detections and the fraction of false alarms both go to 0. FIG. 8 plots the same data as FIG. 7, but in a ROC format. Clearly, if you had a perfect classifier, it would be possible to have the fraction of detections be 1 with the fraction of false alarms be 0, corresponding to a point in the upper left corner of the graph. The closer one gets to this ideal, the better the classifier is. FIG. 8 shows that the PLS classifier can achieve a fraction of detections of roughly 0.92 and a fraction of false alarms of 0.05 using the PLS classifier with 134 extracted features (permissions) plus static features (illustrated by line 810 in the graph). The x-axis represents the fraction of false alarms, and the y-axis represents the fraction of detections. Line 805 illustrates the fraction of detections and fraction of false alarms using the PLS classifier with only the 134 extracted features (permissions).

Bayesian Classifier

Figure 9:
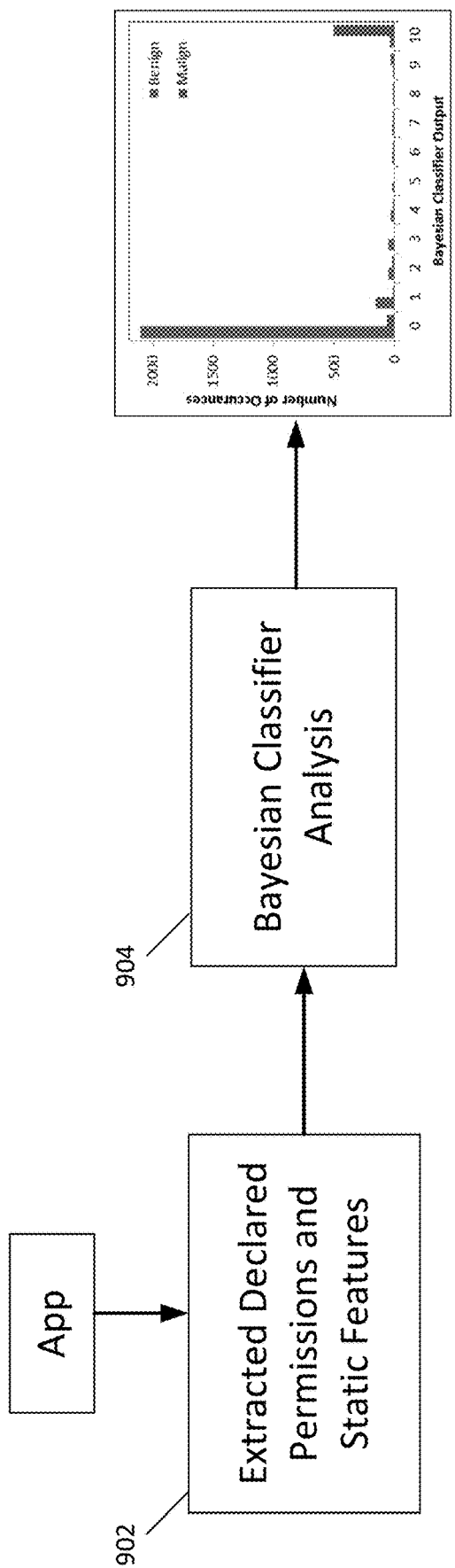
FIG. 9 depicts a RRF system with a Bayesian classifier, according to an example embodiment.

FIG. 9 illustrates the use of a Bayesian model classifier in a RRF system, according to an example embodiment. The feature module 210 and the training module 220 generate the Bayesian model. For example, the feature module 210 extracts declared permissions and static features at block 902. The training module 220 performs a Bayesian classifier analysis at block 904.

In some embodiments, the Bayesian classifier explicitly incorporates a customized (user-defined) threat model using a probabilistic graph with nodes depicting features (as random variables) and edges depicting feature correlations. The active trail enables backward and forward inferencing, which aids in the derivation of a risk score for a computer application. Variants of the Bayesian classifier can be used in various embodiments. For example, the Naïve Bayesian classifier and the Tree Augmented Naïve Bayesian classifier are discussed for use in the RRF system. In some embodiments, GeNIe (Graphical Network Interface) software package, developed by University of Pittsburgh, may be used to construct the Bayesian Network, and to learn structure and parameters of the network. In some embodiments, the Bayesian classifier is implemented in the RRF system using the Samlam libraries, provided by the Automated Reasoning Group at University of California, Los Angeles, so that the classifiers can be queried via the RRF system.

Naïve Bayesian Classifier

In the Naïve Bayesian Classifier, an assumption is made that all random variables are independent of each other given the class variable, and the class variable has no parents, or is the root node of the resulting graph. A class variable is a variable of the class malign and/or benign. This approach facilitates the learning of the network with conditional probabilities depending on the variable under test. In an example implementation, the root of the network is set based on whether the sample input is from a benign or malign input dataset. The equations used to compute the probabilities are as follows:

$$P(M \mid F_1, F_2, \ldots, F_n) = P(F_1, F_2, \ldots, F_n) \mid M)(P(M)) \quad (4)$$

$$P(F_1, F_2, \ldots, F_n \mid M) = \prod_{1 \leq i \leq n} F_i \quad (5)$$

Despite the fact that the independence assumption is usually flawed, the Bayesian Naïve classifier is accurate enough to provide a baseline implementation.

Tree Augmented Naïve (TAN) Bayesian Classifier

In some embodiments, the TAN Bayesian classifier is generated by limiting generation of the Naïve Bayesian, and relaxing the constraint that variables are independent of each other given the root class. The TAN Bayesian classifier can help in managing a Bayesian network with complex interdependencies and large number of nodes.

In an example embodiment, only features that can be reduced to a random variable with two states (present or not present, True or False) are included. This is possible for most of the extracted features since they are either in a Boolean format (i.e. used permissions) or are raw text (i.e. user defined log messages). In some embodiments, additional techniques to process the raw text into discrete values is not used, and the classifier is rather focused on the Boolean features.

Figure 10:
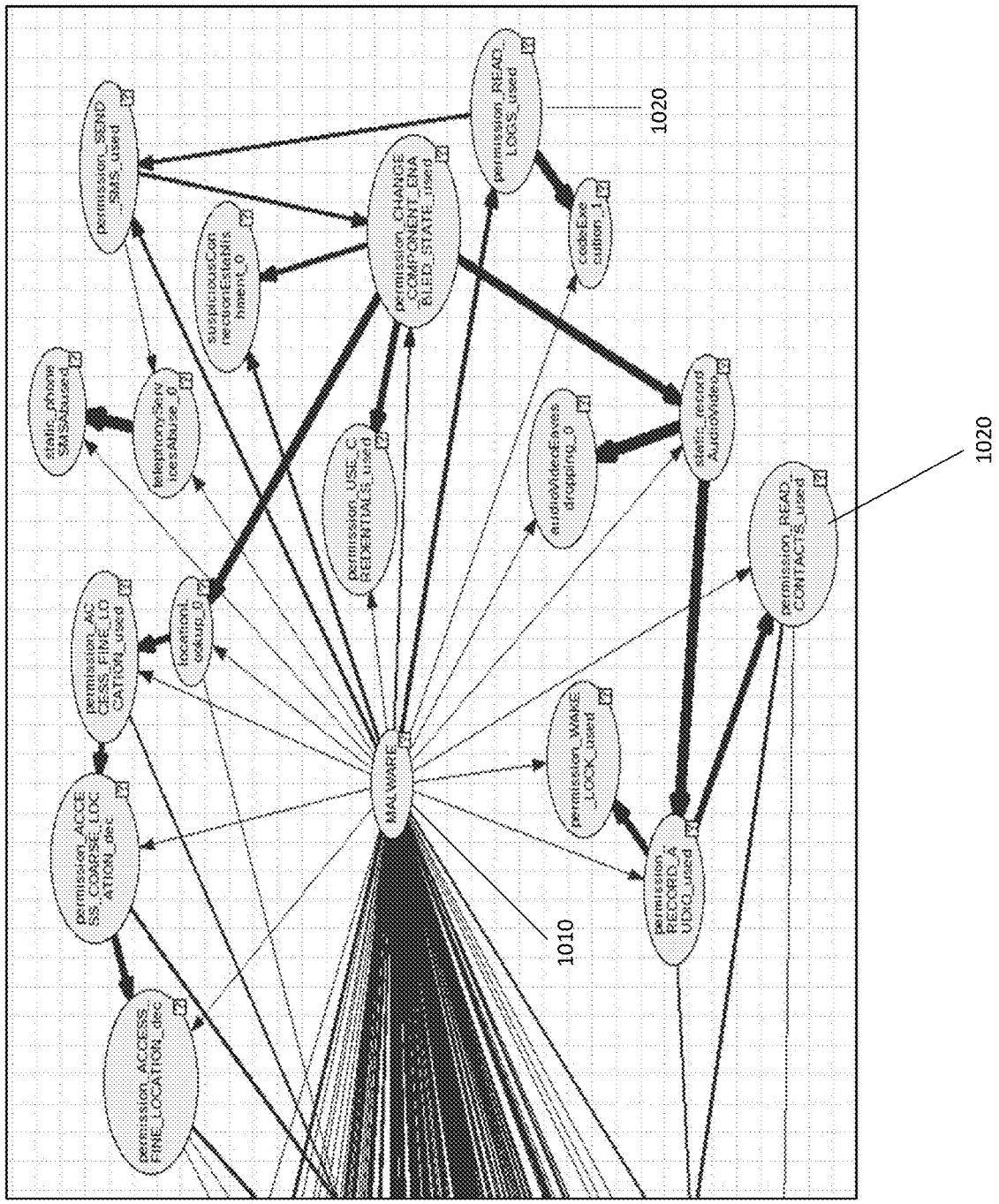
FIG. 10 illustrates a portion of a Bayesian network as a result of the Bayesian model classifier within a RRF system, according to an example embodiment.

FIG. 10 is a portion of an example Bayesian network generated based on the Bayesian model classifier discussed above. The root node 1010 is malware in this example. Nodes 1020 represent the features extracted from the computer applications, and in this example, the features and the correlation of the features within the Bayesian network indicate that the computer application is malware.

Figure 11:
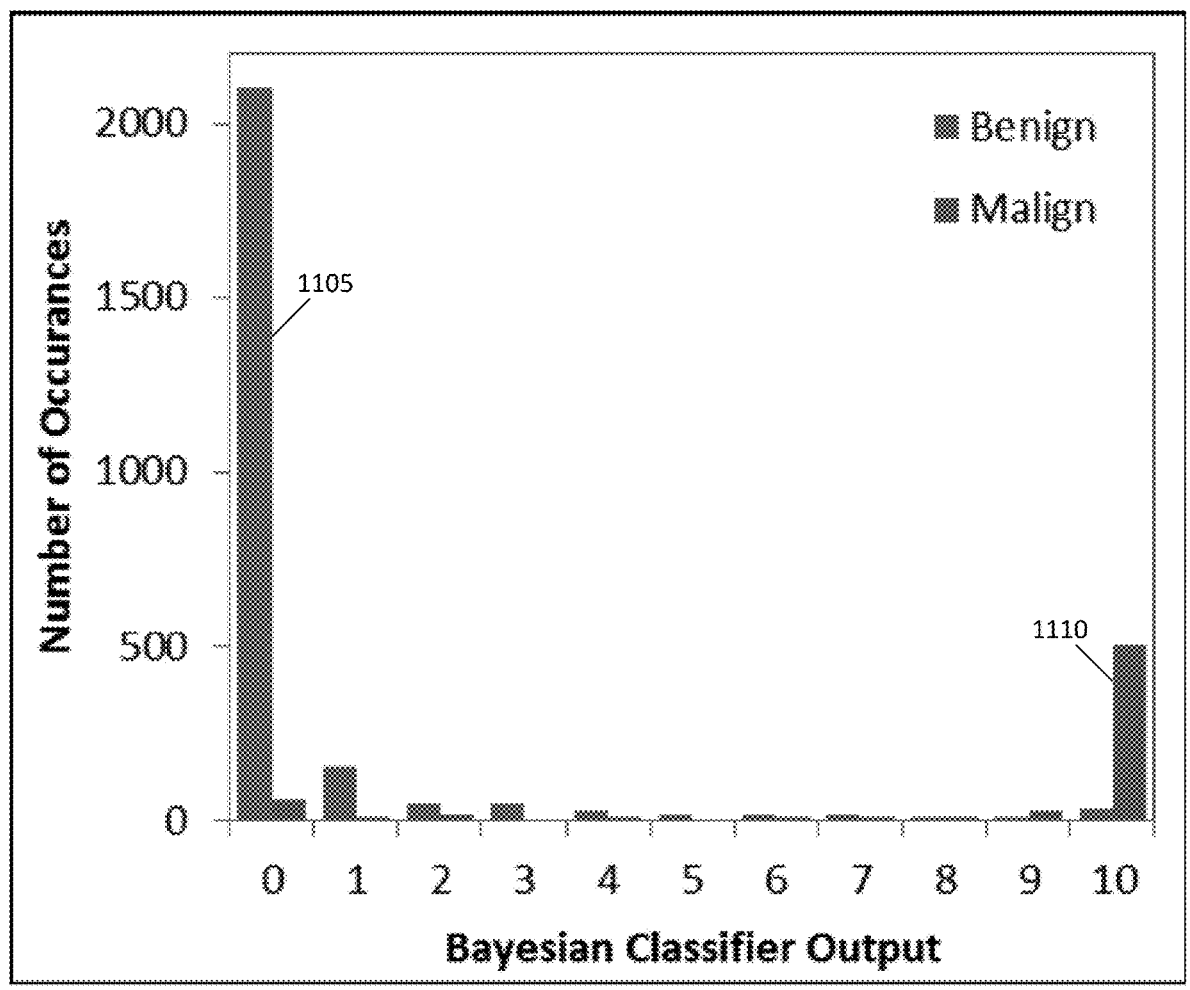
FIG. 11 is a histogram of the results of the Bayesian model classifier within a RRF system, according to an example embodiment.
Figure 12:
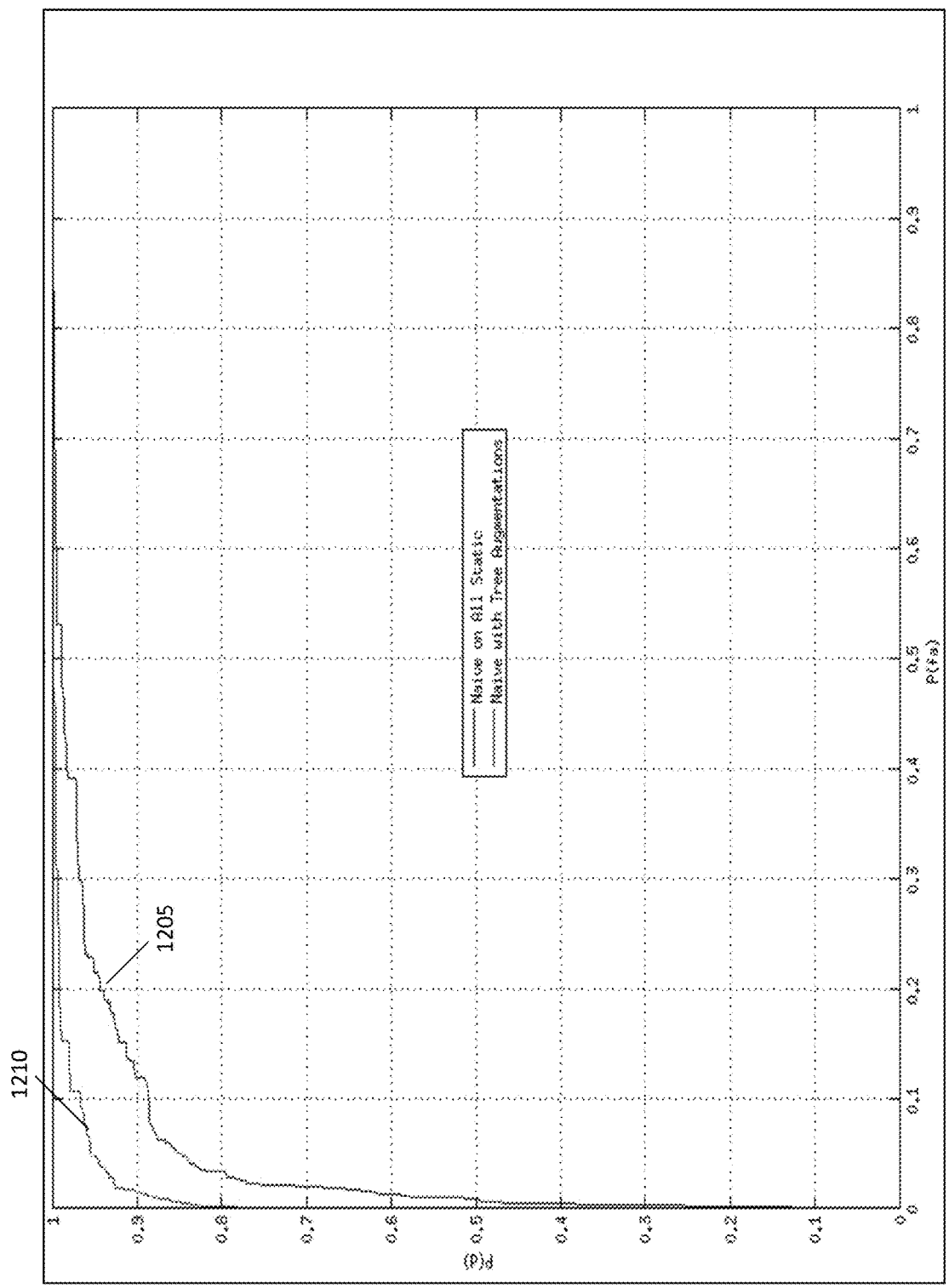
FIG. 12 is a Receiver Operating Curve for the results of the TAN Bayesian classifier within a RRF, according to an example embodiment.

FIGS. 11 and 12 depict the frequency distribution and ROC curve for the TAN Bayesian classifier. As shown in the figure, the results of Tree Augmented Naïve Bayesian is similar to that of PLS (FIGS. 7 and 8). The x-axis represents the risk rating or probability of the application being malware or benign in the range of 0 to 10. The y-axis represents the number of applications for a particular risk rating. The benign applications 1105 have a rating of 0, while the malware applications 1110 have a rating of 10. Since the spread in the middle of the graph is low, FIG. 11 shows that the TAN Bayesian classifier produces a relatively low number of false positives and false negatives. FIG. 12 shows that the Naïve Bayesian classifier can achieve a fraction of detections of roughly 0.89 and a fraction of false alarms of 0.1 (illustrated by line 1205 in the graph), and that the TAN Bayesian classifier can achieve a fraction of detections of roughly 0.97 and a fraction of false alarms of 0.1 (illustrated by line 1210 in the graph). The x-axis represents the fraction of false alarms, and the y-axis represents the fraction of detections. Line 1205 illustrates the fraction of detections and fraction of false alarms for the Naïve Bayesian classifier using static features.

Testing Phase

Once the model classifiers are generated based on the training data, the models are tested on the testing data. As discussed above, the testing data may comprise one third of the total input data set.

Classifier Evaluation

Figure 13:
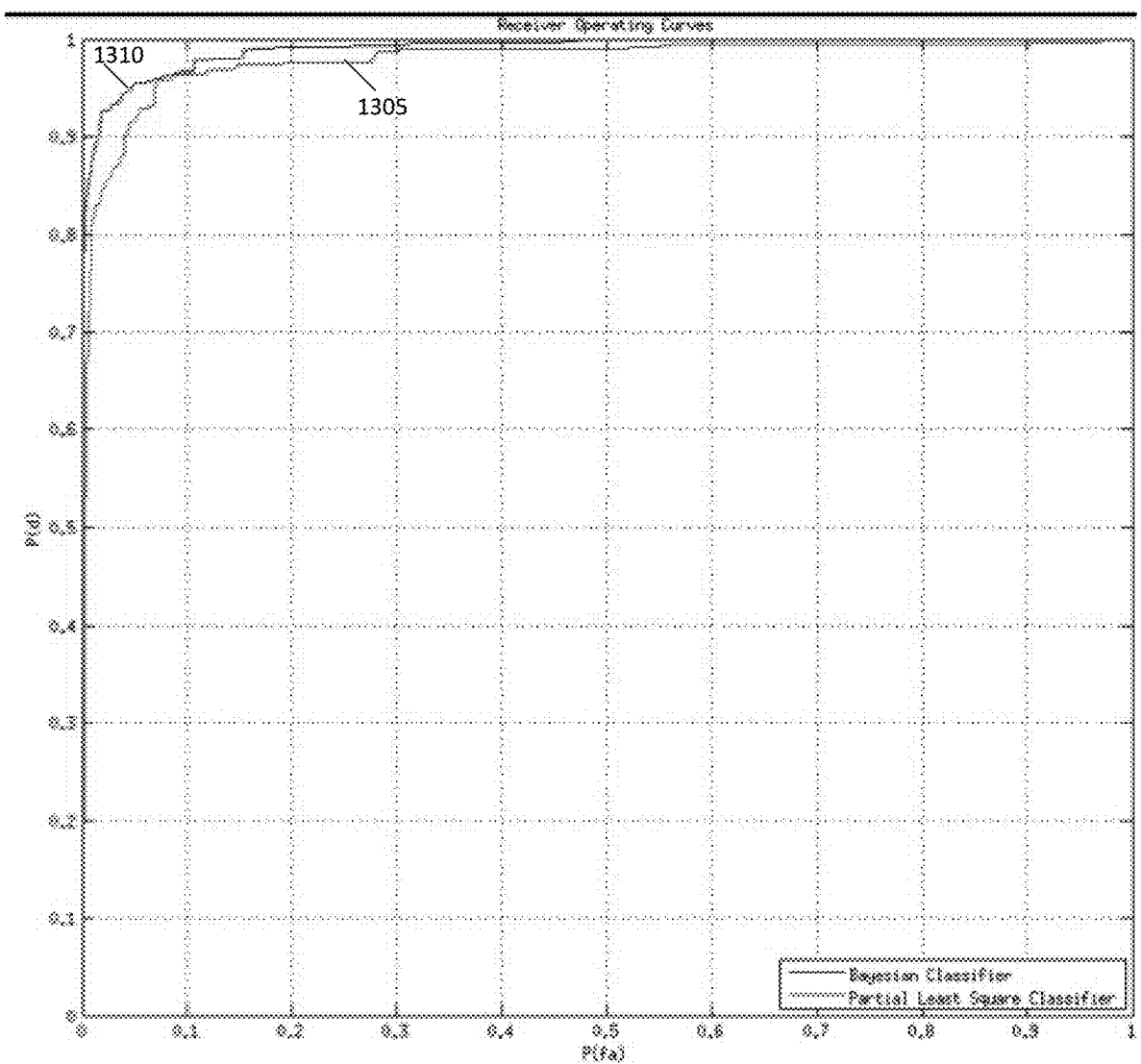
FIG. 13 is a chart comparing the Receiver Operating Curves for the results of the PLS and TAN Bayesian classifiers, according to an example embodiment.
Figure 14:
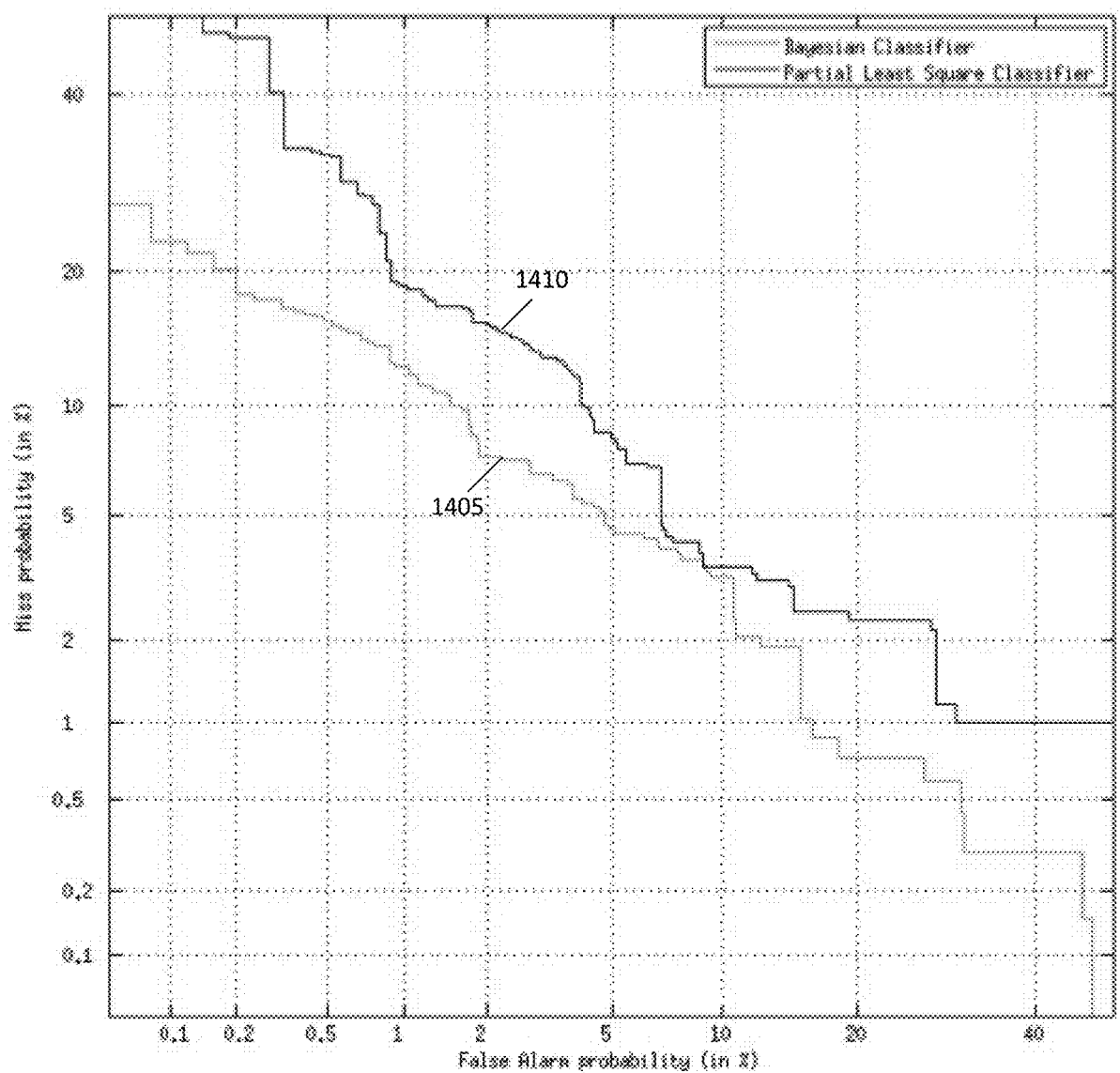
FIG. 14 is a chart graphically depicting a Detection Error Tradeoff Curve for the results of the PLS and TAN Bayesian classifiers, according to an example embodiment.

In an example embodiment, the ROCs (FIG. 13) and the Detection Error Tradeoff Curve (DETC) (FIG. 14) are used for evaluating the performance of the PLS and Bayesian classifiers. FIG. 13 shows the ROC for PLS (line 1305) and TAN Bayesian classifiers (line 1310). FIG. 14 shows the DETC for PLS (line 1410) and TAN Bayesian classifiers (line 1405). As depicted in the figure, the performance of both classifiers is fairly comparable in terms of their false positive rate and accuracy of detection, although TAN Bayesian provided a low number of false positives and missed probabilities compared to PLS. For both the classifiers, an improvement in the performance can be observed with the addition of static features.

Figure 15:
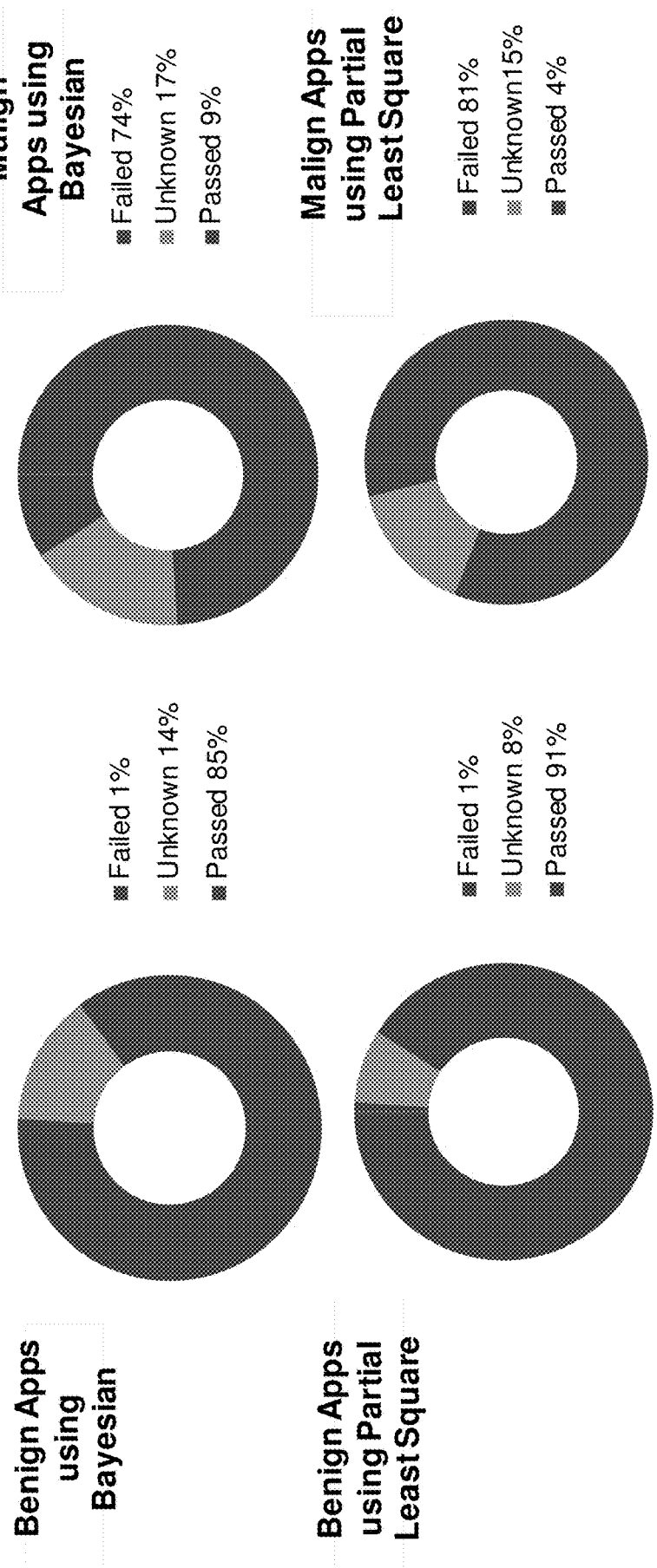
FIG. 15 includes charts graphically depicting the false positive and false negative results of the PLS and TAN Bayesian classifiers, according to an example embodiment.

FIG. 15 is a chart depicting the false positives and false negatives generated by the PLS and TAN model classifiers in the RRF system. A false positive is an application that is actually malware, however, the risk rating determined by the RRF system indicates that the application is benign. A false negative is an application that is actually benign, however, the risk rating determined by the RRF system indicates that the application is malware. It is important to reduce both false positives and false negatives because the former may cause users to ignore the results of the RRF system and the latter may cause detrimental consequences. FIG. 15 compares the PLS and Bayesian classifiers in terms of the percent of applications that are correctly classified given that the input application is malware or benign.

As discussed above, in some embodiments, the RRF system includes the PLS classifier and the Bayesian classifier to analyze a risk level of a computer application. In other example embodiments, the RRF system includes the PLS classifier to analyze a risk level of a computer application. In yet other example embodiments, the RRF system includes the Bayesian classifier to analyze a risk level of a computer application. Additionally, in exemplary embodiments, the RRF system includes compliance checking classifier and/or rule-based classifier to analyze a risk level of a computer application.

In some embodiments, the computer application analyzed is an application run on Android OS or an application run on iOS. In an example embodiment, the features of the Android application are extracted and analyzed using the PLS classifier, or the Bayesian classifier, or the PLS and the Bayesian classifier. In another example embodiment, the features of the iOS application are analyzed by the compliance checking algorithm and the rule-based algorithm (discussed above). The iOS system is a closed system, and not many tools are available to extract features from an iOS application (compared to the tools available for feature extraction for an Android application). Therefore, a subset of features are analyzed for the iOS application (versus the larger set of features analyzed for an Android application). The subset of features for an iOS application may be analyzed by the rule-based algorithm or may be analyzed in a similar manner to the features in an Android application (via PLS classifier and/or Bayesian classifier).

Some of the advantages and benefits of the RRF system described herein are based on the classifiers' applicability to the malware classification domain. Most of the existing approaches rely only the declared critical permissions or on all permissions. Both of the PLS and TAN classifiers described herein use intents, hardware features, and used permissions among others as inputs. Further, both PLS and Bayesian classifiers consider correlations and interdependencies among the input parameters. Finally, both PLS and Bayesian classifiers provide higher precision with a low false positive rate compared to other risk rating systems.

The RRF system described herein can be used by many different organizations in a variety of industries. For example, the RRF system can be used to detect malware and vulnerabilities that can result in leakage of use-credentials, such as user accounts and passwords. It can also be used in the healthcare sector to detect malware and vulnerabilities that can result in leakage of private information, such as medical records. Both PLS and Bayesian classifiers can detect these malicious mobile computer applications before they are deployed on a user's device. The automation of detecting these malicious computer applications by the RRF system is also more efficient in terms of time and money.

Figure 16:
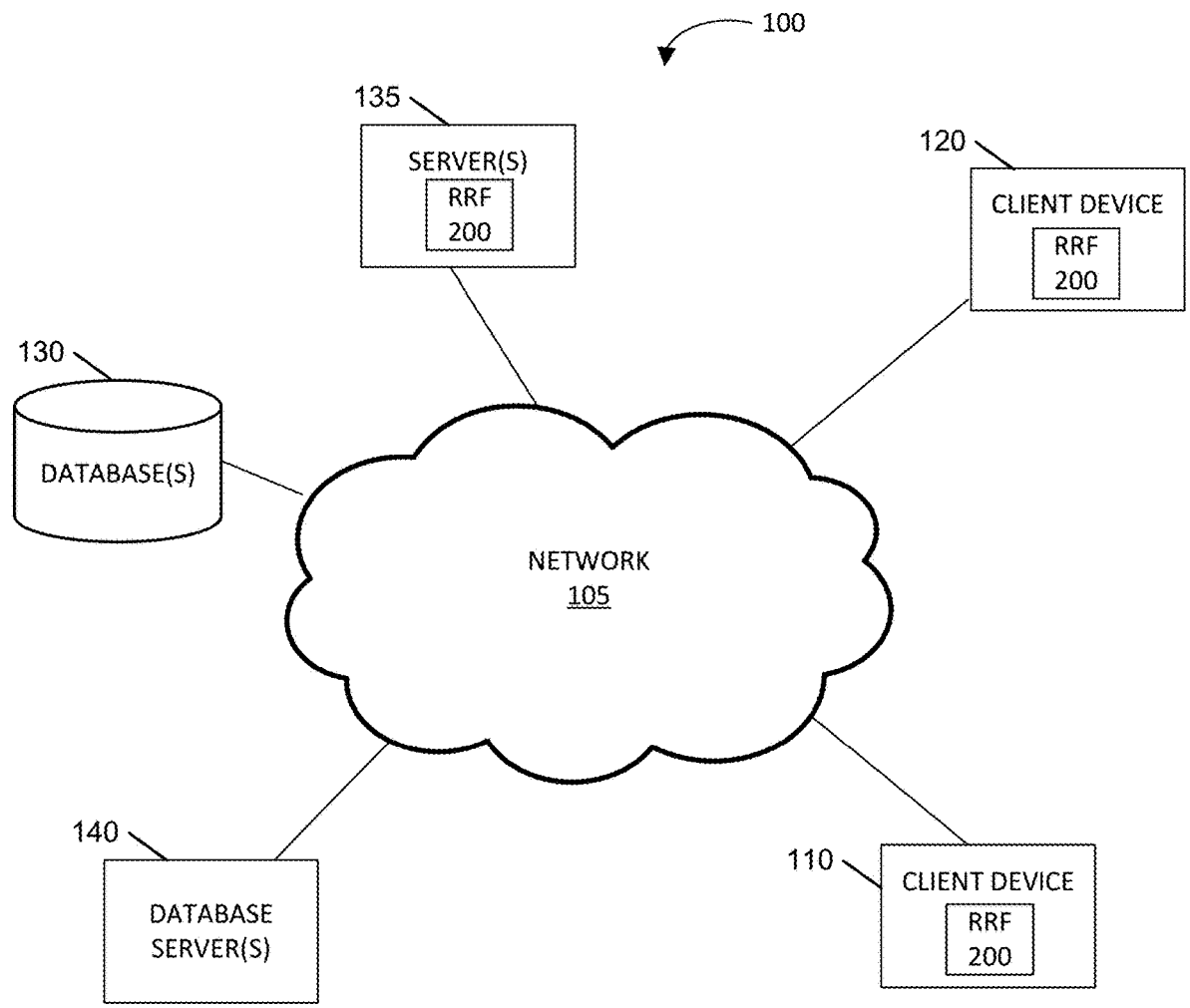
FIG. 16 is a network diagram depicting a RRF system for mobile computer applications, according to an example embodiment.

FIG. 16 illustrates a network diagram depicting a distributed environment 100 for a RRF system 200 for mobile computer applications, according to an example embodiment. The environment 100 can include a network 105, multiple client devices, for example, client device 110, client device 120, a database(s) 130, a server(s) 135, and a database server(s) 140. Each of the client devices 110, 120, database(s) 130, server(s) 135, and database server(s) 140 is in communication with the network 105.

In an example embodiment, one or more portions of network 105 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client devices 110, 120 may comprise, but are not limited to, work stations, computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, tablets, netbooks, and the like.

Each of client devices 110, 120 may connect to network 105 via a wired or wireless connection. Each of client devices 110, 120 may include one or more computer applications such as, but not limited to, web browser application, static analysis application, dynamic analysis application, manifest analysis application, a risk-rating application, and the like. In an example embodiment, the client devices 110, 120 may perform all the functionalities described herein.

In other embodiments, the RRF system 200 may be included on the client device 110, 120 and the server 135 performs the functionalities described herein. In yet another embodiment, the client devices 110, 120 may perform some of the functionalities, and server 135 performs the other functionalities described herein. For example, server 135 may train and test the RRF system models and classifiers, while client devices 110, 120 may analyze the mobile computer application and provide a risk-rating.

Each of the database 130, database server 140, and server 135 is connected to the network 105 via a wired connection. Alternatively, one or more of the database 130, database server 140, and server 135 may be connected to the network 105 via a wireless connection. Although not shown, database server 140 can be (directly) connected to database 130, or server 135 can be (directly) connected to the database server 140 and/or databases 130. Server 135 comprises one or more computers or processors with central processing units (CPUs) configured to communicate with client devices 110, 120 via network 105. Server 135 hosts one or more applications or websites accessed by client devices 110, 120 and/or facilitates access to the content of database 130. Database server 140 comprises one or more computers or processors having one or more CPUs configured to facilitate access to the content of database 130. Database 130 comprises one or more storage devices for storing data and/or instructions (or code) for use by server 135, database server 140, and/or client devices 110, 120. Database 130, server 135, and/or database server 140 may be located at one or more geographically distributed locations from each other or from client devices 110, 120. Alternatively, database 130 may be included within server 135 or database server 140.

Machine Embodiments

It is explicitly contemplated that the methods, systems and media presented herein may be carried out, e.g., via one or more programmable processing units having associated therewith executable instructions held on one or more computer readable medium, RAM, ROM, hard drive, and/or hardware for solving for, deriving and/or applying ranking functions according to the classifiers taught herein. In exemplary embodiments, the hardware, firmware and/or executable code may be provided, e.g., as upgrade module(s) for use in conjunction with existing infrastructure (e.g., existing devices/processing units). Hardware may, e.g., include components and/or logic circuitry for executing the embodiments taught herein as a computing process.

Displays and/or other feedback means may also be included to convey detected/processed data. Thus, in exemplary embodiments, the user interface for the composable analytics plaform may be displayed, e.g., on a monitor. The display and/or other feedback means may be stand-alone or may be included as one or more components/modules of the processing unit(s). In exemplary embodiments, the display and/or other feedback means may be used to facilitate creation of modules and applications as described herein.

The actual software code or control hardware which may be used to implement some of the present embodiments is not intended to limit the scope of such embodiments. For example, certain aspects of the embodiments described herein may be implemented in code using any suitable programming language type using, for example, conventional or object-oriented programming techniques. Such code is stored or held on any type of suitable computer-readable medium or media such as, for example, a magnetic or optical storage medium.

As used herein, a "processor," "processing unit," "computer" or "computer system" may be, for example, a wireless or wireline variety of a personal computer (PC), microcomputer, minicomputer, server, mainframe, laptop, personal data assistant (PDA), smartphone, tablet, cellular phone, pager, processor, fax machine, scanner, or any other programmable device configured to transmit and receive data over a network. Computer systems disclosed herein may include memory for storing certain software applications used in obtaining, processing and communicating data. It can be appreciated that such memory may be internal or external to the disclosed embodiments. The memory may also include storage medium for storing software, including a hard disk, an optical disk, floppy disk, ROM (read only memory), RAM (random access memory), PROM (programmable ROM), EEPROM (electrically erasable PROM), etc.

Figure 17:
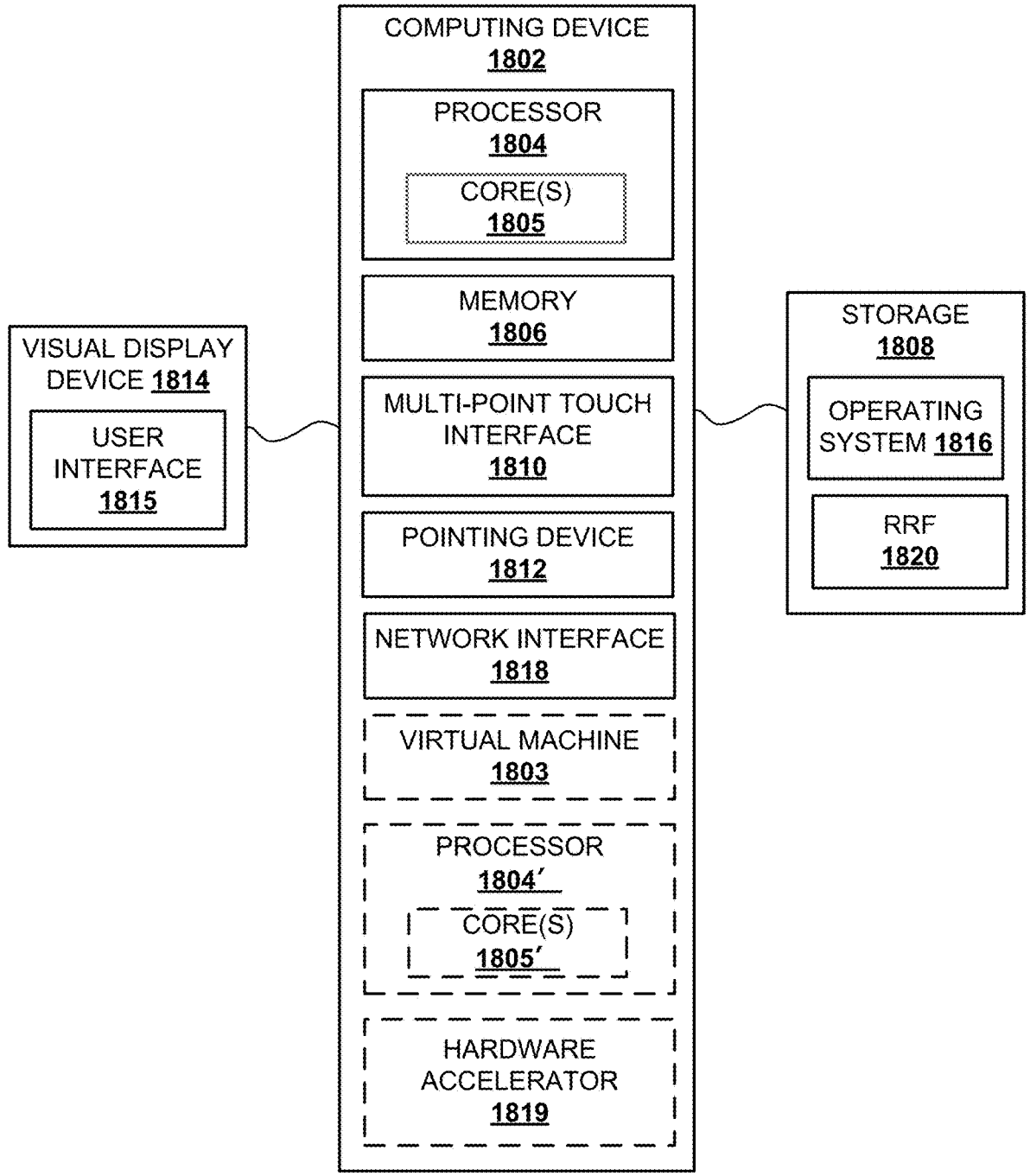
FIG. 17 is an exemplary computing environment suitable for implementing exemplary embodiments of the RRF system.

Referring now to FIG. 17, an exemplary computing environment suitable for practicing exemplary embodiments is depicted. The environment may include a computing device 1802 which includes one or more media for storing one or more computer-executable instructions or code for implementing exemplary embodiments. For example, memory 1806 included in the computing device 1802 may store computer-executable instructions or software, e.g. instructions for implementing and processing every module of the RRF system 1820.

The computing device 1802 also includes processor 1804, and, one or more processor(s) 1804' for executing software stored in the memory 1806, and other programs for controlling system hardware. Processor 1804 and processor(s) 1804' each can be a single core processor or multiple core (1805 and 1805') processor. Virtualization can be employed in computing device 1802 so that infrastructure and resources in the computing device can be shared dynamically. Virtualized processors may also be used with the RRF system 1820 and other software in storage 1808. A virtual machine 1803 can be provided to handle a process running on multiple processors so that the process appears to be using only one computing resource rather than multiple. Multiple virtual machines can also be used with one processor. Other computing resources, such as field-programmable gate arrays (FPGA), application specific integrated circuit (ASIC), digital signal processor (DSP), Graphics Processing Unit (GPU), and general-purpose processor (GPP), may also be used for executing code and/or software. A hardware accelerator 1819, such as implemented in an ASIC, FPGA, or the like, can additionally be used to speed up the general processing rate of the computing device 1802.

The memory 1806 may comprise a computer system memory or random access memory, such as DRAM, SRAM, EDO RAM, etc. The memory 1806 may comprise other types of memory as well, or combinations thereof. A user may interact with the computing device 1802 through a visual display device 1814, such as a computer monitor, which may display one or more user interfaces 1815. The visual display device 1814 may also display other aspects or elements of exemplary embodiments. The computing device 1802 may include other I/O devices such a keyboard or a multi-point touch interface 1810 and a pointing device 1812, for example a mouse, for receiving input from a user. The keyboard 1810 and the pointing device 1812 may be connected to the visual display device 1814. The computing device 1802 may include other suitable conventional I/O peripherals. The computing device 1802 may further comprise a storage device 1808, such as a hard-drive, CD-ROM, or other storage medium for storing an operating system 1816 and other programs, e.g., a program for the RRF system 1820 including computer executable instructions for determining a risk-rating for an application, as taught herein.

The computing device 1802 may include a network interface 1818 to interface to a Local Area Network (LAN), Wide Area Network (WAN) or the Internet through a variety of connections including, but not limited to, standard telephone lines, LAN or WAN links, broadband connections, wireless connections, controller area network (CAN), or some combination of any or all of the above. The network interface 1818 may comprise a built-in network adapter, network interface card, PCMCIA network card, card bus network adapter, wireless network adapter, USB network adapter, modem or any other device suitable for interfacing the computing device 1802 to any type of network capable of communication and performing the operations described herein. Moreover, the computing device 1802 may be any computer system such as a workstation, desktop computer, server, laptop, handheld computer or other form of computing or telecommunications device that is capable of communication and that has sufficient processor power and memory capacity to perform the operations described herein.

The computing device 1802 can be running any operating system such as any of the versions of the Microsoft® Windows® operating systems, the different releases of the Unix and Linux operating systems, any version of the MacOS® for Macintosh computers, any version of iOS for iPhones®, any version of Android® OS, Windows Phone OS, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Although the teachings herein have been described with reference to exemplary embodiments and implementations thereof, the disclosed methods, systems and media are not limited to such exemplary embodiments/implementations. Rather, as will be readily apparent to persons skilled in the art from the description taught herein, the disclosed methods, systems and media are susceptible to modifications, alterations and enhancements without departing from the spirit or scope hereof. Accordingly, all such modifications, alterations and enhancements within the scope hereof are encompassed herein.

What is claimed is:

1. A computer-implemented method for training a risk rating system for assessing a risk of a mobile application, the method comprising:
    extracting, from a corpus of mobile applications and malware, features representing operational characteristics of the mobile applications and features representing operational characteristics of the malware or malware-like behavior;
    constructing a feature vector from the extracted features, the feature vector having n-tuples of Boolean variables and single Boolean variables, wherein the n-tuples of the Boolean variables in the feature vector is a product of n independent Boolean variables;
    training a first learning classifier using the feature vector, wherein the first learning classifier is a Partial Least Square model classifier;
    training a second learning classifier using the feature vector, wherein the second learning classifier is a Bayesian model classifier; and
    generating a machine learning risk rating model based on a combination of the first learning classifier, and the second learning classifier to calculate a risk rating based on the features and a correlation of the features indicating a risk level for the corpus of mobile applications and malware, wherein the correlation of features corresponding to the known-malware indicate a high risk, and the correlation of features corresponding to the mobile applications indicate a low risk.

2. The method of claim 1, wherein the Bayesian model classifier is a Naïve Bayesian model classifier or a Tree-Augmented Naïve Bayesian model classifier.

3. The method of claim 1, wherein the risk-rating is determined based on a simultaneous existence of two or more features.

4. The method of claim 1, wherein the features are represented in binary form where false indicates absence of the feature and true indicates presence of the feature.

5. The method of claim 1, wherein the one or more features of the mobile application includes declared permissions of the mobile application, intents of the mobile application, and used permissions of the mobile application.

6. The method of claim 1, wherein the risk rating model is further generated based on user defined security guidelines.

7. The method of claim 6, further comprising calculating the risk rating based on compliance with rules indicated in the user defined security guidelines.

8. The method of claim 1, wherein the first learning classifier achieves a fractions of detections of more than 92% and a fraction of alarms of less than 5%.

9. A computer-implemented method for assessing a risk of a mobile application, the method comprising:
    receiving a mobile application;
    extracting features representing an operational characteristic of the mobile application;

constructing a feature vector from the extracted features, the feature vector having n-tuples of Boolean variables and single Boolean variables, wherein the n-tuples of the Boolean variables in the feature vector is a product of n independent Boolean variables;

inputting the feature vector into a trained risk rating model system, wherein the risk rating model uses a first learning classifier and a second learning classifier, the first learning classifier being a Partial Least Square model classifier, and the second learning classifier being a Bayesian model classifier; and determining a risk-rating for the mobile application based on a result of the trained risk rating model.

10. The method of claim 9, wherein the risk rating model is trained using the method in claim 1.

11. A non-transitory computer readable medium storing instructions executable by a processing device, wherein execution of the instructions causes the processing device to implement a method for training a risk rating system for assessing a risk of a mobile application comprising:

extracting, from a corpus of mobile applications and malware, features representing operational characteristics of the mobile application and features of the malware or malware-like behavior;

constructing a feature vector from the extracted features, the feature vector having n-tuples of Boolean variables and single Boolean variables, wherein the n-tuples of the Boolean variables in the feature vector is a product of n independent Boolean variables;

training a first learning classifier using the feature vector, wherein the first learning classifier is a Partial Least Square model classifier;

training a second learning classifier using the feature vector, wherein the second learning classifier is a Bayesian model classifier; and generating a machine learning risk rating model based on a combination of the first learning classifier, and the second learning classifier to calculate a risk rating based on the features and a correlation of the features indicating a risk level for the corpus of mobile applications and malware, wherein the correlation of features corresponding to the known-malware indicate a high risk, and the correlation of features corresponding to the mobile applications indicate a low risk.

12. The non-transitory computer readable medium of claim 11, wherein the risk-rating is determined based on a simultaneous existence of two or more features.

13. The non-transitory computer readable medium of claim 11, wherein the features are represented in binary form where false indicates absence of the feature and true indicates presence of the feature.

14. The non-transitory computer readable medium of claim 11, wherein the one or more features of the mobile application includes declared permissions of the mobile application, intents of the mobile application, and used permissions of the mobile application.

15. The non-transitory computer readable medium of claim 11, wherein the risk rating model is further generated based on user defined security guidelines.

16. A non-transitory computer readable medium storing instructions executable by a processing device, wherein execution of the instructions causes the processing device to implement a method for assessing a risk of a mobile application comprising:

receiving a mobile application;

extracting features representing an operational characteristic of the mobile application;

constructing a feature vector from the extracted features, the feature vector having n-tuples of Boolean variables and single Boolean variables, wherein the n-tuples of the Boolean variables in the feature vector is a product of n independent Boolean variables;

inputting the feature vector into a trained risk rating model, wherein the risk rating model uses a first classifier and a second classifier, the first classifier being a Partial Least Square model classifier, and the second learning classifier being a Bayesian model classifier; and determining a risk-rating for the mobile application based on a result of the trained risk rating model.

17. A system for assessing a risk of a mobile application, the system comprising:

a feature module programmed to:
  extract features of the mobile application and construct a feature vector from the extracted features, the feature vector having n-tuples of Boolean variables and single Boolean variables, wherein the n-tuples of the Boolean variables in the feature vector is a product of n independent Boolean variable;

a risk-rating module programmed to:
  apply a machine learning classifier to the feature vector, wherein the machine learning classifier is a Partial Least Square model classifier and a Bayesian model classifier; and
  calculate, based on a classification from the machine learning classifier of the one or more features, a numeric likelihood that the mobile application contains malware or malware-like behavior.

18. The system of claim 17, further comprising:

a training module programmed to:
  receive a corpus of mobile applications and malware; and the feature module further programmed to:
  extract, from the corpus of mobile applications and malware, one or more features representing operational characteristics of the mobile applications and one or more features representing operational characteristics of the malware or malware-like behavior;

the training module further programmed to:
  train a first learning classifier using the extracted features;
  generate a machine learning risk rating model based on the first learning classifier to calculate a risk rating based on the features and a correlation of the features indicating a risk level for the corpus of mobile applications and malware, wherein the correlation of the features corresponding to the malware indicate a high risk, and the correlation of the features corresponding to the mobile applications indicate a low risk.

19. The system of claim 17, wherein the training module is further configured to analyze accuracy of the generated risk rating model based a second plurality of mobile applications including a set of known-malware applications and known-benign applications.

20. The system of claim 17, wherein the mobile application is any one of a computer application, server application, and thin-client application.

* * * * *